(12) United States Patent
Oh

(10) Patent No.: US 9,510,134 B2
(45) Date of Patent: Nov. 29, 2016

(54) METHOD FOR PERFORMING MACHINE TYPE COMMUNICATION FOR THE PURPOSE OF COVERAGE IMPROVEMENT, APPARATUSES AND SYSTEMS FOR PERFORMING THE SAME

(71) Applicant: Hyunyong Song, Seoul (KR)

(72) Inventor: Hyukjun Oh, Seoul (KR)

( * ) Notice: Subject to any disclaimer, the term of this patent is extended or adjusted under 35 U.S.C. 154(b) by 0 days.

(21) Appl. No.: 14/987,778

(22) Filed: Jan. 5, 2016

(65) Prior Publication Data

US 2016/0295345 A1   Oct. 6, 2016

(30) Foreign Application Priority Data

| Apr. 2, 2015 | (KR) | 10-2015-0046893 |
| Apr. 23, 2015 | (KR) | 10-2015-0057580 |
| May 26, 2015 | (KR) | 10-2015-0073249 |
| May 28, 2015 | (KR) | 10-2015-0075325 |
| Nov. 30, 2015 | (KR) | 10-2015-0169116 |

(51) Int. Cl.
| H04W 4/00 | (2009.01) |
| H04W 72/04 | (2009.01) |
| H04L 5/14 | (2006.01) |
| H04B 1/713 | (2011.01) |
| H04W 74/08 | (2009.01) |

(52) U.S. Cl.
CPC ............ *H04W 4/005* (2013.01); *H04B 1/713* (2013.01); *H04L 5/14* (2013.01); *H04W 72/0406* (2013.01); *H04W 74/0833* (2013.01)

(58) Field of Classification Search
CPC ........... H04W 4/005; H04W 72/0406; H04W 74/0833; H04B 1/713; H04L 5/14
See application file for complete search history.

(56) References Cited

U.S. PATENT DOCUMENTS

| 8,644,864 B2 | 2/2014 | Zeira et al. | |
| 2013/0077582 A1 | 3/2013 | Kim et al. | |
| 2013/0083753 A1 | 4/2013 | Lee et al. | |
| 2013/0308572 A1* | 11/2013 | Sayana | H04W 72/048 370/329 |
| 2014/0003262 A1* | 1/2014 | He | H04W 28/08 370/252 |
| 2014/0064067 A1* | 3/2014 | Drewes | H04L 5/0044 370/230 |
| 2015/0131579 A1* | 5/2015 | Li | H04L 1/0072 370/329 |

(Continued)

FOREIGN PATENT DOCUMENTS

| KR | 10-2013-0032548 A | 4/2013 |
| KR | 10-2014-0071480 A | 6/2014 |
| WO | 2015/030523 A1 | 3/2016 |

OTHER PUBLICATIONS

Ericsson, "Further LTE Physical Layer Enhancements for MTC", Mar. 9-12, 2015, 3GPP TSG RAN Meeting #67, RP-150492, pp. 1-9.*

(Continued)

*Primary Examiner* — Paul H Masur

(57) ABSTRACT

A method of performing a downlink machine type communication from a base station to a MTC (machine type communication) terminal includes, at the base station, transmitting at least one of a system information—the system information excluding a Master Information Block (MIB)—, a control information and data to the MTC terminal using a system bandwidth having a predetermined size. The base station performs frequency hopping using a frequency hopping pattern in a unit of narrow band on the at least one of the system information—the system information excluding a Master Information Block (MIB)—, the control information and the data to transmit to the MTC terminal, and the narrow band is less than the system bandwidth.

18 Claims, 17 Drawing Sheets

(56) References Cited

U.S. PATENT DOCUMENTS

| | | | |
|---|---|---|---|
| 2015/0223243 A1* | 8/2015 | Tabet | H04W 28/085 370/330 |
| 2015/0263840 A1* | 9/2015 | Rastogi | H04L 5/0053 370/329 |
| 2016/0088594 A1* | 3/2016 | Xiong | H04W 72/042 370/329 |

OTHER PUBLICATIONS

Nokia Networks et al., "PBCH/MIB Enhancement for MTC", 3GPP TSG-RAN WG1 Meeting #80, R1-150262, Feb. 18, 2015, 5 pages.
NEC, "Frequency hopping schemes for LTE Rel-13 MTC", 3GPP TSG RAN WG1 Meeting #80, R1-150286, Feb. 18, 2015, 4 pages.
International Search Report issued on Jul. 25, 2016 for International Application No. PCT/KR2016/003318.

* cited by examiner

METHOD FOR PERFORMING MACHINE TYPE COMMUNICATION FOR THE PURPOSE OF COVERAGE IMPROVEMENT, APPARATUSES AND SYSTEMS FOR PERFORMING THE SAME

CLAIM FOR PRIORITY

This application claims priority to Korean Patent Application No. 10-2015-0046893 filed on Apr. 2, 2015, Korean Patent Application No. 10-2015-0057580 filed on Apr. 23, 2015, Korean Patent Application No. 10-2015-0073249 filed on May 26, 2015, Korean Patent Application No. 10-2015-0075325 filed on May 28, 2015, and Korean Patent Application No. 10-2015-00169116 filed on Nov. 30, 2015 in the Korean Intellectual Property Office (KIPO), the entire contents of which are hereby incorporated by reference.

BACKGROUND

1. Technical Field

The present invention relates to methods for performing Machine Type Communication (MTC) (or Machine-to-Machine (M2M) communications), apparatuses and systems for performing the same, and more specifically to methods for performing Machine Type Communications (MTC) for the purpose of coverage improvement, and apparatuses and systems for performing the same.

2. Description of the Related Art

Embodiment of the Internet of Things (IoT) depends on arranging as many Machine Type Communication (MTC) terminals (e.g., Machine-to-Machine (M2) terminals) as possible and reducing the price the MTC terminals as low as possible.

The MTC terminals can be used in various application fields, require low power consumption, and is expected to perform communication for infrequent small burst transmission.

SUMMARY

In the case of application of Machine Type Communication (MTC) (or Machine-to-Machine (M2M) or IoT (Internet of Things)), MTC terminals such as Machine Type Communication (MTC) terminals (e.g., an electricity meter, a water meter, and a gas meter) may be used deep inside a building and may require coverage improvement compared to existing Long Term Evolution (LTE) cell coverage.

Some MTC terminals may be installed in a space shielded by a building which is insulated with metal flakes or consists of metal windows or thin walls, or may be installed in an underground of a building. Due to this installation characteristic, the MTC terminals may be more likely to experience penetration losses in a wireless interface than a general LTE terminal.

MTC terminals existing in an ultimate coverage scenario may have a low data speed, great delay tolerance, and no-mobility, and thus, some messages and/or channels may not be necessary in the case of communications using the MTC terminals.

Technologies for improving coverage of an MTC terminal need to consider coverage, power consumption, cell frequency efficiency, effects on a standard, manufacturing costs, and complexity.

In the case of existing MTC, there is required a technology which enables communications in an existing common network at a small frequency bandwidth, such as 1.4 MHz, regardless of the current bandwidth of a base station.

In particular, in the case of existing MTC, a data transmission rate is about 100 kbps (a bandwidth is fixed to 1.4 MHz), so that there is required a method for dramatically improving coverage while maintaining low power consumption of an MTC terminal.

It does not mean that all terminals require coverage improvement: the need of coverage improvement may differ between terminals, so that technologies for coverage improvement may be enabled only for terminals in need of coverage improvement.

There is required a technology for improving coverage of an MTC terminal by 20 dB compared to a general Category 1 LTE User Equipment (UE) having a minimum data transmission rate.

If coverage of an MTC terminal improves significantly, physical channels used therefor need to be improved as well, and, in order to improve coverage of an MTC terminal by 20 dB, all uplink physical channels and all downlink physical channels including a Shared channel (SCH), a Broadcast Channel, and a Physical Downlink Control Channel (PDCCH), need to be improved.

If a technology of reducing a single receive Radio Frequency (RF) and a bandwidth is applied to MTC terminals, it may lead to reduction in downlink coverage, and thus, an additional coverage improvement technology is needed to compensate for a coverage loss.

Specifically, if a single receive RF chain is applied to MTC terminals, additional coverage supplement is needed for all downlink channels, and if the maximum bandwidth is reduced, coverage supplement is needed for a (Enhanced) Physical Downlink Control Channel ((E)PDCCH) and a Physical Downlink Shared Channel (PDSCH).

In addition, as the coverage supplement technology, low-cost MTC technologies should be applied. If reduction in costs and coverage improvement are allowed altogether, it may deteriorate performance of an LTE system.

Meanwhile, 20 dB or greater coverage improvement is necessary for MTC terminals, but when a bandwidth of 1.4 MHz and a single receiver RF chain are available, data receiving performance may be poor compared to a existing general mobile communication terminal. Therefore, there is required various advanced technologies which enable securing 20 dB or greater coverage by improving performance under this environment.

In addition, operation of an uplink Random Access Channel (RACH) is one of the most important elements for a coverage improvement technology. An RACH is a kind of data requesting signal which is transmitted by a terminal to a base station at an arbitrary time for access to the base station and data transmission, and the RACH initiates communications which starts in all terminals, and thus, there is required a technology that enables a base station to successfully receive an RACH signal from a far distant MTC terminal, for which 20 dB or greater coverage has been made, and successfully transmit a response signal to the MTC terminal.

Regarding the overall operations, if a base station and/or terminal is able to distinguish an MTC coverage extension terminal from a general mobile communication terminal in advance, it may help to increase efficiency in MTC coverage improvement communications. Therefore, there is also required a technology of distinguishing an MTC coverage extension terminal from a general terminal in the RACH process in which a terminal makes an attempt for the initial access.

The present invention aims to provide method for extending coverage and maintaining lower power consumption for the purpose of coverage extension, and apparatuses and systems performing the same.

According to some example embodiment of the present invention, a method of performing a downlink machine type communication from a base station to a MTC (machine type communication) terminal includes, at the base station, transmitting at least one of a system information—the system information excluding a Master Information Block (MIB)—, a control information and data to the MTC terminal using a system bandwidth having a predetermined size, the base station performs frequency hopping using a frequency hopping pattern in a unit of narrow band on the at least one of the system information—the system information excluding a Master Information Block (MIB)—, the control information and the data to transmit to the MTC terminal, and the narrow band is less than the system bandwidth. The frequency hopping pattern may be generated or determined by using at least one of a cell identifier (ID), a terminal ID, system frame number and subframe index. The frequency hopping pattern may be transmitted using persistent scheduling to the MTC terminal. The frequency hopping may be not performed on PSS (Primary Synchronization Signal) and SSS (Secondary Synchronization Signal) for synchronization, and PBCH carrying the system information. The frequency hopping may be performed at a specific narrow band set. In case of a time division duplex (TDD) transmission scheme, an identical set of narrow bands may be used for a uplink transmission and a downlink transmission. An available narrow band set may be notified to the MTC terminal by using a system information, the system information may include at least one of MIB and SIB, the MIB and SIB may be broadcasted to all MTC terminals in a network, or wherein an information of an available narrow band set may be notified to the MTC terminal by encoding the at least one of MIB and SIB with a specific code representing a specific number.

According to other example embodiment of the present invention, a method of performing a uplink machine type communication from a MTC (machine type communication) terminal to a base station includes, at the MTC terminal, transmitting at least one of a control information, a random access signal and data to the base station using a system bandwidth having a predetermined size, the MTC terminal performs frequency hopping using a frequency hopping pattern in a unit of narrow band on the at least one of the control information, the random access signal and the data to transmit to the base station, and the narrow band is less than the system bandwidth.

According to other example embodiment of the present invention, a method of performing a downlink machine type communication from a base station to a MTC (machine type communication) terminal includes, at the base station, transmitting at least one of a system information—the system information at least one of Master Information Block (MIB) and System Information Block (SIB)—, a control information and data to the MTC terminal using a system bandwidth having a predetermined size, and the base station repetitively transmits at least one of the system information, the control information and the data to the MTC terminal. The repetitively transmitting may be persistently scheduled by applying persistent scheduling to a repetition transmission patter. The repetitively transmitting of the MIB may include at least one of repetitively transmitting the same signal and repetitively transmitting the same data with different types of signal. The different types of signal may be a signal encoded differently. An MTC coverage extension terminal may be operated as at least one of a small coverage terminal and a large coverage terminal according to a channel state.

A method for performing Machine Type Communication (MTC) for the purpose of coverage improvement according to another aspect of the present invention uses a PRACH signal to distinguish an MTC coverage extension terminal from a general terminal.

A Physical Random Access Channel (PRACH) preamble may be used to distinguish the MTC coverage extension terminal from the general terminal.

Time and frequency resource location may be used to distinguish the MTC coverage extension terminal from the general terminal.

A specific pattern indicative of an MTC terminal may be used to distinguish the MTC coverage extension terminal from the general terminal.

A pattern generated by combining a specific single pattern indicative of an MTC terminal with an existing PRACH preamble may be used to distinguish the MTC coverage extension terminal from the general terminal.

In the method in which a pattern generated by combining a specific single pattern indicative of an MTC terminal with an existing PRACH preamble may be used to distinguish the MTC coverage extension terminal from the general terminal, an existing PRACH preamble may not be transmitted repetitively, but transmitted by changing a code value of Time Division Multiplexing (TDM), Frequency Division Multiplexing (FDM) pattern, or CDM.

CDM and a repetition transmission pattern may be combined to distinguish the MTC coverage extension terminal from the general terminal. A method for performing Machine Type Communication (MTC) communications according to one aspect for achieving the aforementioned objective of the present invention transmits narrow band usage information from an MTC terminal when downlink frequency hopping is performed for MTC communications. An available narrow band set may be notified to MTC terminals within a network by using system information or a downlink control channel.

A method for performing Machine Type Communication (MTC) communications according to another aspect for achieving the aforementioned objectives of the present invention performs multi-subframe scheduling when downlink frequency hopping is performed.

A method for performing Machine Type Communication (MTC) communications according to another aspect for achieving the aforementioned objective of the present invention adaptively manages the aforementioned method in order to efficiently respond to a change which occurs because of difference in transmission channels which is due to coverage difference. A change of a transmission channel or difference in transmission channel states experienced by MTC terminal(s) may be notified based on a pilot signal in a PRACH and a PUSCH or sounding signal, which is received at a base station in an uplink, and accordingly, the number of repetition of transmission and a frequency hopping pattern may be adaptively and differently applied according to the change of a transmission channel or the difference in transmission channel states. The number of repetition of transmission and a frequency hopping pattern may be adaptively or differently applied according to a level of coverage of a corresponding terminal. The number of repetition of transmission and the frequency hopping pattern may be adaptively or differently applied according to the distance between MTC terminals, or the difference in transmission channel states—for example, a transmission channel status is poor at a MTC terminal operating at underground—. The required level of coverage can be inferred from channel states estimated based on PRACH, DMRS included in PUSCH, or Sounding signals. Since the required number of repetition of transmission for an IoT terminal on ground is quite different from the required number of repetition of transmission for an IoT terminal underground, the number of repetition of transmission and the frequency hopping pattern, etc may be adaptively or differently applied according to the transmission channel status experienced by each IoT terminal.

Although features and elements are described above in particular combinations, one of ordinary skill in the art will appreciate that each feature or element can be used alone or in any combination with the other features and elements. In addition, the methods described herein may be implemented in a computer program, software, firmware, or hardware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer. The processor may be implemented by a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like.

According to the aforementioned methods for performing Machine Type Communication (MTC) for the purpose of coverage improvement, and apparatuses and systems performing the same, it is possible to dramatically improve coverage while maintaining low power consumption.

According to the aforementioned methods for performing multi-subframe scheduling in the case of performing frequency hopping by a MTC terminal, and apparatuses and systems performing the same, it is possible to dramatically improve coverage while increasing a data rate and reducing the number of switching of subframes.

DESCRIPTION OF EXAMPLE EMBODIMENTS OF THE PRESENT INVENTION

Figure 1:
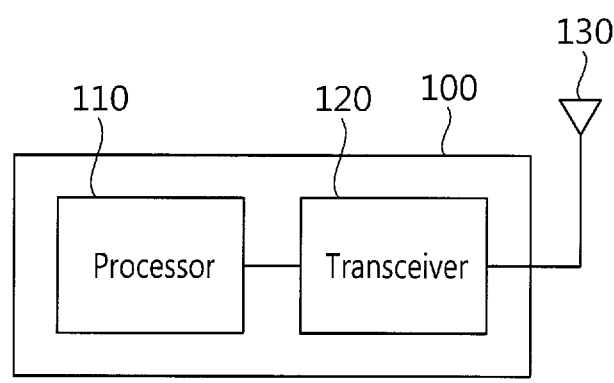
FIG. 1 is a schematic block diagram illustrating a Machine Type Communication (MTC) terminal according to the present invention.

Various modifications and variations may be made to the present invention. Hereinafter, some particular embodiments will be described in detail with reference to the accompanying drawings.

However, it should be understood that the present invention is not limited to the embodiments and all the variations or replacements of the invention or their equivalents are included in the technical spirit and scope of the present invention.

The terms "first" and "second" may be used to describe various components, but the components are not limited thereto. These terms are used only to distinguish one component from another. For example, the first component may be also named the second component, and the second component may be similarly named the first component without departing from the scope of the present invention. The term "and/or" includes a combination of a plurality of related items as described herein or any one of the plurality of related items.

When a component is "connected" or "coupled" to another component, the component may be directly connected or coupled to the other component, but it should be understood that other components may be intervene. In contrast, when a component "is directly connected" or "coupled" to another component, no other components intervene.

The terms used herein are given to describe only the specific embodiments but not intended to limit the present invention. A singular term includes a plural term unless otherwise stated obviously. As used herein, the terms "include" or "have" are used to indicate that there are features, numerals, steps, operations, components, parts or combinations thereof as described herein, but do not exclude the presence or possibility of addition of one or more features, numerals, steps, operations, components, parts or components thereof.

Unless defined otherwise, all the terms including technical or scientific terms as used herein have the same meanings as those generally understood by one of ordinary skill in the art. Such terms as generally defined in the dictionary should be interpreted as having meanings consistent with those understood in the context of the related technologies, and should not be construed as having excessively formal or ideal meanings unless clearly defined in the instant application.

A terminal may include but is not limited to a user equipment (UE), a user terminal (UT), mobile terminal, an access terminal (AT), terminal, a fixed or mobile subscriber unit, Subscriber Station (ss), celluar (tele)phone, wireless device, wireless communication device, Wireless Transmit/Receive Unit (WTRU), mobile node, mobile, a mobile station (MS), a personal digital assistant (PDA), smart phone, laptop, netbook, personal computer, wireless sensor, consumer electronics (CE) or other terminologies.

Various embodiments of terminal may include but is not limited to celluar telephone, smart phone with wireless communication capability, personal digital assistant (PDA) with wireless communication capability, wireless modem, portable computer with wireless communication capability, photography apparatus such as digital camera with wireless communication capability, wearable device with wireless communication capability, gaming apparatus with wireless communication capability, consumer electronics for storing and playback music with wireless communication capability, internet consumer electronics with wireless internet access and browsing capabilities, and portable unit or any terminal where integrated with combination of such capabilities or functions.

A base station generally refers to a fixed station that communicates with the UE. The base station may include but is not limited to a Node-B, evolved-NodeB (eNB or eNode-B), an advanced base station (ABS), an HR-BS, a site controller, base transceiver system (BTS), an access point (AP), or any other type of interfacing device capable of operating in a wireless environment.

The base station may be part of a RAN (radio access network), which may also include other base stations and/or network elements (not shown), such as a base station controller (BSC), a radio network controller (RNC), relay nodes, and the like. The base station may be configured to transmit and/or receive wireless signals within a particular geographic region, which may be referred to as a cell (not shown).

The cell may further be divided into cell sectors. For example, the cell associated with the base station may be divided into three sectors. Thus, in one embodiment, the base station may include three transceivers, i.e., one transceiver for each sector of the cell. In another embodiment, the base station may employ multiple-input multiple-output (MIMO) technology and, therefore, may utilize multiple transceivers for each sector of the cell.

A Machine Type Communication (MTC) communication terminal includes a terminal that is embedded with a sensor and has a communication function to embody MTC communication. For example, the MTC communication terminal may include a Machine Type Communication (MTC) terminal, a narrow band Long Term Evolution (NB-LTE) terminal, a Cellular Internet of Things (NB-CIoT) terminal.

Hereinafter, example embodiments of the present invention are described in detail with reference to accompanying drawings. To provide better understanding of the present invention, the same reference numeral is used to an identical element and descriptions are omitted for the identical element.

Figure 3:
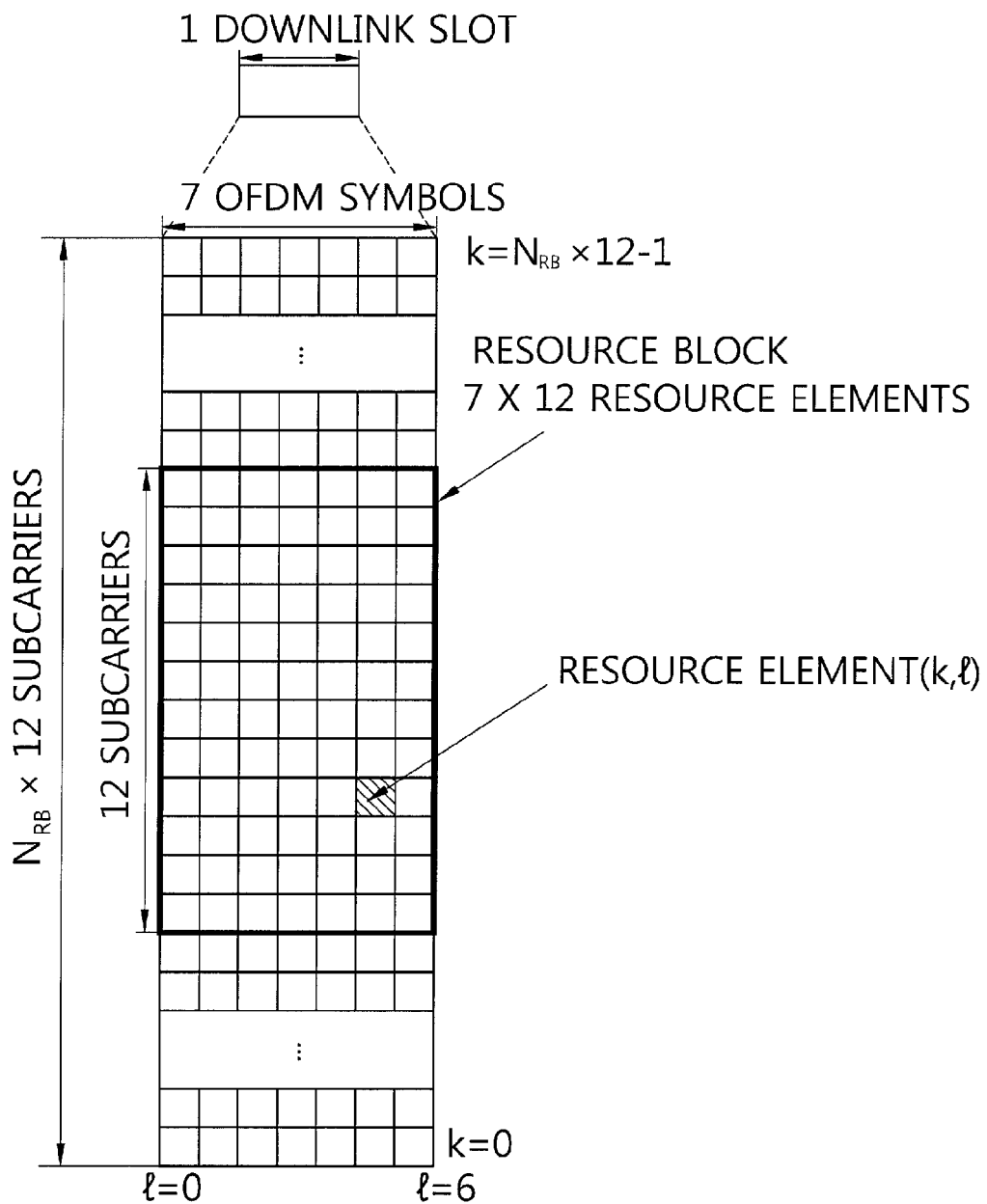
FIG. 3 is a conceptual diagram illustrating a resource grid relative to a single downlink slot in a Long Term Evolution (LTE) system.

FIG. 3 shows an example of a resource grid of a single downlink slot in an LTE system.

Referring to FIG. 3, a downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 6 to 110. One resource block may include a plurality of subcarriers in the frequency domain. An uplink slot may have the same structure as that of the downlink slot.

Each element on the resource grid is called a resource element. The resource elements on the resource grid can be identified by a pair of indexes (k,l) in the slot. Here, k (k=0, . . . , $N_{RB} \times 12-1$) is a subcarrier index in the frequency domain, and l(l=0, . . . , 6) is an OFDM symbol index in the time domain.

FIG. 3 illustrated that one resource block includes 7×12 resource elements made up of seven OFDM symbols in the time domain and twelve subcarriers in the frequency domain, however the number of OFDM symbols and the number of subcarriers in the resource block are not limited thereto. The number of OFDM symbols and the number of subcarriers may vary depending on the length of a CP (cyclic prefix), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol. In case a narrow band narrower than current narrow band for Machine Type Communication, a small number such as 64, 32, 16 or 8 may be selectively used as the number of subcarriers in one OFDM symbol, and the number of subcarriers in one OFDM symbol may be adjusted depending upon the bandwidth used for Machine Type Communication.

A bandwidth of an LTE system may be various in a range between 1 MHz and 20 MHz. In case a narrow band narrower than current narrow band for Machine Type Communication, a bandwidth of an LTE system may be less than 1 MHz.

Figure 4A:
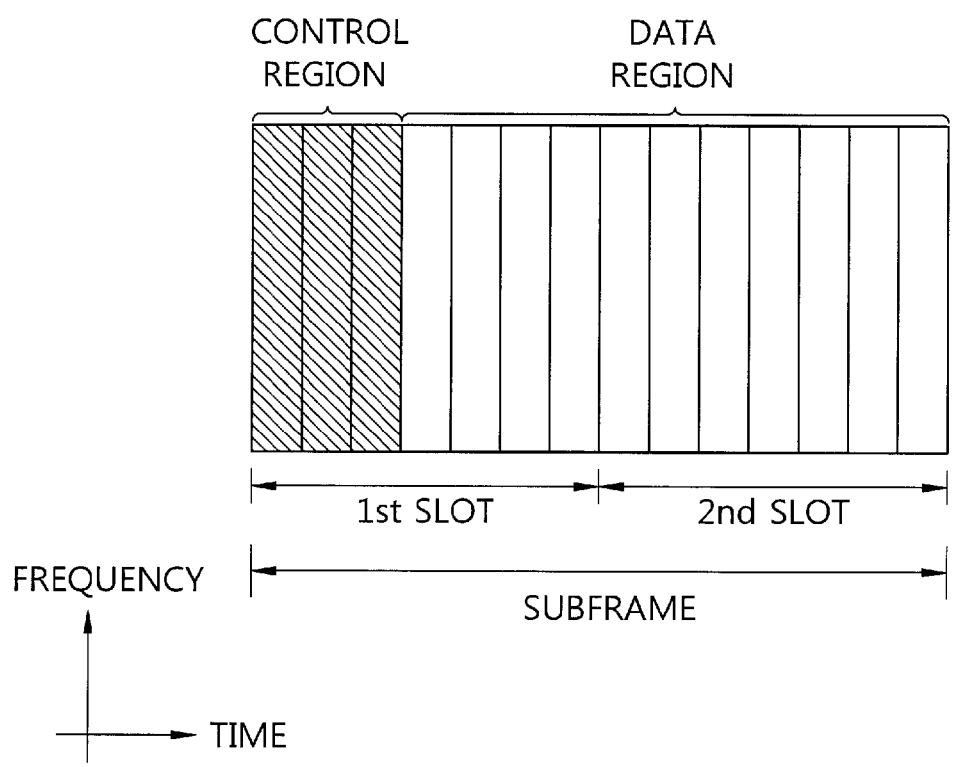
FIG. 4A is a conceptual diagram illustrating a downlink subframe structure in an LTE system.

FIG. 4A shows a structure of a downlink subframe in an LTE system.

Referring to FIG. 4A, a downlink subframe includes two slots in the time domain, and each of the slots includes seven OFDM symbols in the normal CP. First three OFDM symbols (maximum four OFDM symbols for a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The base station determines a PDCCH format according to a DCI to be transmitted to the UE, and attaches a cyclic redundancy check (CRC) to control information. A unique identifier such as radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Alternatively, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 4B:
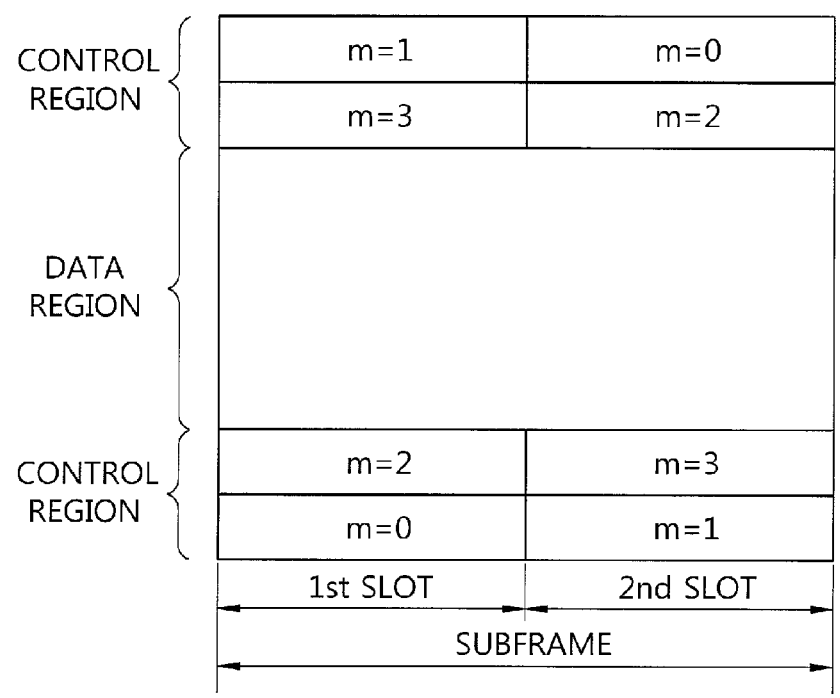
FIG. 4B illustrates an uplink subframe structure in an LTE system.

FIG. 4B shows a structure of an uplink subframe in an LTE system.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH for a UE is allocated by a pair of resource blocks RBs in a subframe. The resource blocks belonging to the pair of RBs occupy different subcarriers in first and second slots, respectively. The frequency occupied by the RBs belonging to the pair of RBs is changed at a slot boundary. This is said that the pair of RBs allocated to the PUCCH is frequency-hopped at the slot boundary. The UE can obtain a frequency diversity gain by transmitting uplink control information through different subcarriers according to time. In FIG. 4B, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Alternatively, the uplink data may include only control information.

As an example of a MTC communication terminal, an MTC terminal needs 20 dB or greater coverage improvement, but when a bandwidth of 1.4 MHz and a single receiver RF chain are available, data receiving performance may be poor compared to an existing general mobile communication terminal.

Therefore, there are required various advanced technologies which enable improving performance so as to secure 20 dB or greater coverage under this environment. As examples of such technologies, there are a scheme of dramatically improving a Signal to Noise Ratio (SNR) by repetition transmission and a scheme of securing a diversity gain by performing frequency hopping of 1.4 MHz over an entire system band.

MTC Frequency Hopping Scheme

A maximum bandwidth supported by a normal LTE terminal for a single carrier is 20 MHz. One of technologies for reducing a cost of an MTC terminal is reducing the maximum bandwidth supported by a terminal to a bandwidth smaller than 20 MHz (e.g., 5 MHz, 3 MHz, 1.4 MHz, 200 KHz, and the like). The technology of reducing the maximum bandwidth able to be supported by a terminal may be applied to a downlink and/or uplink, an RF component and/or a baseband component, and a data and/or control channel. A location of a frequency of the reduced bandwidth (a data channel and/or control channel) less than 20 MHz may be fixed to the center of a carrier bandwidth or at both ends of carrier bandwidth or one end of carrier bandwidth, or may be changed semi-statically, dynamically, or in a predetermined pattern according to each MTC terminal. For machine type communication, the location of a frequency of the reduced bandwidth (used for a data channel and/or control channel) less than 20 MHz may be aligned in a unit of RB (resource block) on a frequency axis. Since 1.4 MHz corresponds to 6-PRB, in case of 10 MHz bandwidth, the total number of PRB is 50 and 50 cannot be exactly divided by 6, and thus extra PRB(s) exist, the location of a frequency of the extra PRB of the reduced bandwidth (used for the data channel and/or control channel) less than 20 MHz may be fixed to the center of a carrier bandwidth or at both ends of carrier bandwidth or one end of carrier bandwidth.

In the case of data transmission in an MTC terminal, data is transmitted using only a reduced bandwidth of 1.4 MHz, but an entire system bandwidth which is actually allocated may be greater than 1.4 MHz. The entire system bandwidth may be, for example, 20 MHz, 10 Hhz, 5 MHz, or 3 MHz. The reduced bandwidth of 1.4 MHz may, for example, correspond to 6 Physical Resource Block (PRB). The reduced bandwidth of 200 KHz or 180 KHz may correspond to 1 RB. 1 PRB—for example 180 KHz—can be used for the downlink transmission of data or control signal from a base station to a terminal.

Meanwhile, in the case of data transmission in existing LTE, a downlink uses a frequency distributed scheduling (FDS) scheme to distribute resources in a frequency domain and allocate the distributed resources, and accordingly, the effects of a frequency hopping scheme may be achieved, and thus, a frequency hopping scheme is not additionally applied to the downlink data transmission whereas a frequency hopping scheme through an uplink physical layer data transmission channel (e.g., a physical uplink shared channel (PUSCH)) is applied only in the case of uplink data transmission. That is, existing LTE does not additionally apply the frequency hopping scheme for downlink data transmission, but applies the frequency hopping scheme through an uplink physical layer data transmission channel (e.g., a PUSCH)) for uplink data transmission.

However, in the case of an LTE downlink, the FDS scheduling is able to be employed only when the entire bandwidth is wide, and thus, a technology of performing frequency hopping of the entire (data channels and/or control channels) is required in the case of a bandwidth limited to 1.4 MHz or 200 KHz or 180 KHz.

In the case of LTE downlink data transmission in MTC communications according to an example embodiment of the present invention, data may be transmitted in a manner that 1.4 .MHz is frequency-hopped by using an entire system bandwidth greater than 1.4 MHz and a hopping pattern. The hopping pattern may be periodical or aperiodical. The hopping pattern may be aperiodical when data transmission is completed before one period of pattern is repeated.

First, a method for transmitting uplink data in an MTC terminal in the case of MTC communications according to an example embodiment is described.

An MTC terminal transmits data by using the entire system bandwidth greater than 1.4 MHz; specifically, it is able to transmit data by performing frequency hopping of 1.4 MHz in a pattern, such as Time Switched Transmit Diversity (TSTD). The hopping pattern may be periodical or aperiodical. The hopping pattern may be aperiodical when data transmission is completed before one period of pattern is repeated.

In the case of uplink transmission in MTC communications, unlike the existing LTE system, the data may be transmitted to a terminal by performing frequency hopping through a downlink physical layer data transmission channel (PDSCH). In addition, in the case of uplink transmission in MTC communications, the data may be transmitted to a base station by performing frequency hopping through an uplink physical layer data transmission channel (e.g., a PUSCH).

In addition, even in the case of transmitting system information, such as System Information Block (SIB) other than a Master Information Block (MIB), a paging signal, and the like, frequency hopping may be performed using an entire system bandwidth greater than the bandwidth 1.4 MHz.

Specifically, in the case of LTE downlink transmission in MTC communications, not just data, but also system information (e.g., an SIB), control information (e.g., a PDCCH) and a (E)PDCCH, may be transmitted by performing frequency hopping using an entire system bandwidth greater than 1.4 MHz.

Specifically, in the case of LTE uplink transmission in MTC communications, not just data, but also control information (e.g., a PUCCH) and a random access signal (e.g., a PRACH) may be transmitted by performing frequency hopping using an entire system bandwidth greater than 1.4 .MHz.

A Primary Synchronization Signal (PSS)/Secondary Synchronization Signal (SSS) used for synchronization and a PBCH used for notifying system information may not be subject to frequency hopping.

Figure 4C:
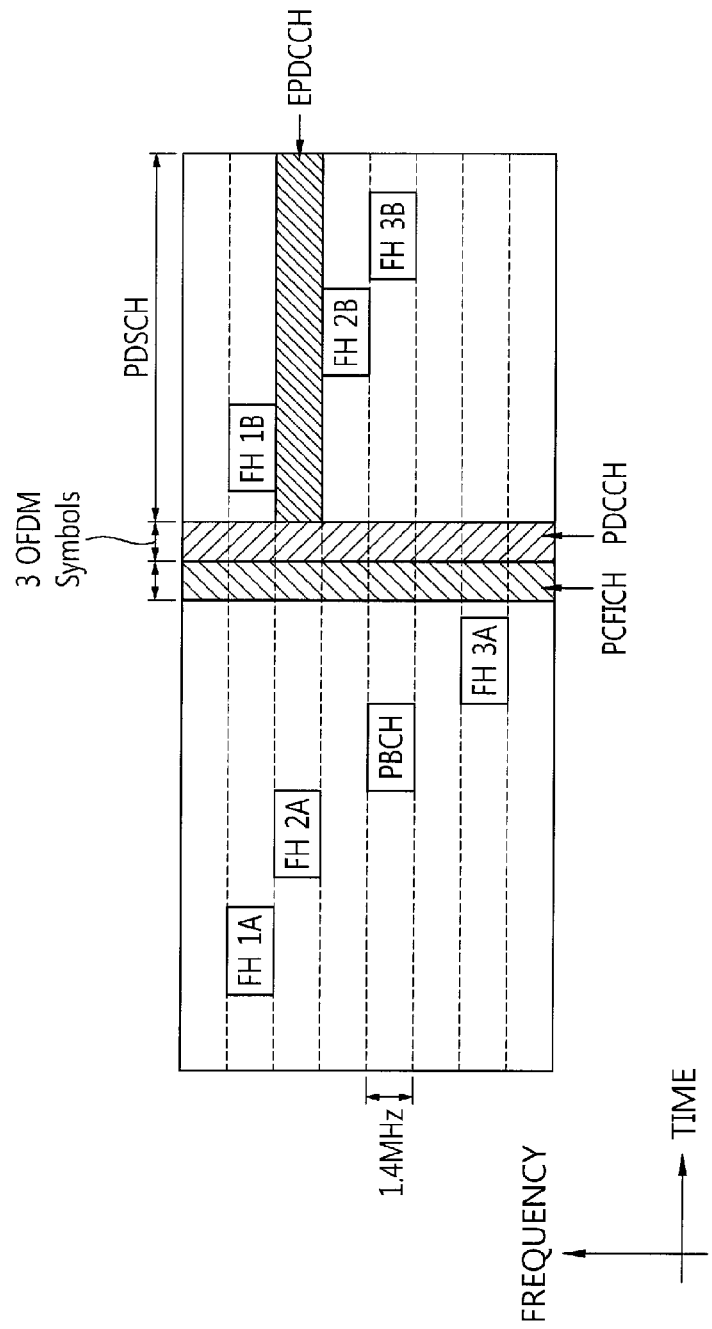
FIG. 4C is a conceptual diagram illustrating a downlink frame structure according to an example embodiment of the present invention.

FIG. 4C is a conceptual diagram illustrating an example of a downlink frame structure according to an example embodiment of the present invention.

A frame may consist of ten subframes each of 1 ms. Each frame is distinguished by a System Frame Number (SFN). An SFN may be used for controlling various types of transmission cycle which may have a time period longer than a frame, such as a paging and sleep-mode period and a channel state reporting period.

FIG. 4C is an example of a case where a PBCH, a PCFICH, a PDCCH, and a PDSCH are mapped to a downlink frame.

In an LTE system, PDCCHs are allocated in order to transmit a downlink control signal which controls a terminal. An region to which PDCCHs of terminals are mapped may be a PDCCH region or a control region.

A PCFICH is transmitted with information on the number of Orthogonal Frequency Division Multiplexing (OFDM) symbols which are used in a subframe for allocating PDCCHs. Information on the number of OFDM symbols to which the PDCCHs are allocated is a Control Format Indicator (CFI). Every terminal within a cell needs to search for an region to which the PDCCH are to be allocated, and accordingly, the CIF may be set to be a cell-specific value. In general, a control region to which the PDCCH are to be allocated to the front OFDM symbols of a downlink subframe, and the PDCCH may be allocated to up to three OFDM symbols.

For example, a CIF is set to be 3, and accordingly, a PDCCH is allocated to three OFDM symbols in a subframe. A terminal may detect its own PDSCH from a control region, and detect its PDSCH based on the PDCCH detected from the control region. In an MTC system, for efficient use of resources, a PCFICH is not transmitted every TTI: instead, a fixed CFI is used or the PCFICH is transmitted only at a specific TTI. In the case of using a fixed CFI, a specific value for the CFI may be predetermined or the PCFICH may be transmitted using a MID or an SIB.

As a new control channel other than the existing PDCCH, an enhanced PDCCH (e-PDCCH) may be introduced. The e-PDCCH may be allocated to a data region, not a control region to which a PDCCH is allocated. As the e-PDCCH is defined, a control signal may be transmitted to each terminal and it may solve the short of the existing PDCCH region.

Referring to FIG. 4C, in the case of MTC communications according to an example embodiment of the present invention, 1.4 MHz is frequency-hopped by using an entire system bandwidth greater than 1.4 MHz and a hopping pattern (FH1A, FH2A, FH3A, . . . , or FH1B, FH2B, FH3B, . . . ), so that system information (e.g., an SIB) and control information (e.g., a PDCCH and a (E)PDCCH) may be transmitted to an MTC terminal. At this point, a hopping pattern of an SIB may be implicitly/explicitly obtained using information contained in an MIB and a Cell ID obtained during a synchronization process.

In the case of downlink transmission in MTC communications according to an example embodiment of the present invention, the data may be transmitted by performing frequency hopping through a downlink physical layer data transmission channel (PDSCH), which is different from a case for existing LTE. In addition, in the case of uplink transmission in MTC communications according to an example embodiment of the present invention, the data may be transmitted by performing frequency hopping through a uplink physical layer data transmission channel (e.g., a PUSCH)). In addition, in the case of downlink transmission in MTC communications according to an example embodiment, frequency hopping may be performed using an entire system bandwidth greater than 1.4 MHz to transmit system information, such as an a SIB other than an MIB. In addition, in the case of uplink transmission in MTC communications according to an example embodiment of the present invention, frequency hopping may be performed using an entire system bandwidth greater than 1.4 MHz to transmit control information (e.g., a PUCCH), a random access signal (e.g., a PRACH), and the like.

An MTC terminal uses a narrow band to communicate with a base station. The narrow band is a minimum bandwidth used for transmission of information, signals, and data between the MTC terminal and the base station, and the narrow band may be used on a PRB or subcarrier unit basis.

In MTC communications, frequency hopping between subcarriers in a narrow band may be performed, or frequency hopping between narrow bands (or in a unit of narrow band) may be performed.

A PSS, an SSS, or a PBCH may be divided into a plurality of part to be carried onto a plurality of narrow bands which is smaller than 1.4 MHz, therefore PSS, an SSS, or a PBCH may be spread more in a time domain region when compared with the case in which the PSS, an SSS, or a PBCH is carried onto one 1.4 MHz bandwidth. In case the PSS, an SSS, or a PBCH is divided into a plurality of part to be carried onto a plurality of narrow bands which is smaller than 1.4 MHz, it is required more transmission time when compared with the case in which the PSS, an SSS, or a PBCH is not divided into a plurality of parts to be carried onto one 1.4 MHz bandwidth. Namely, it is required more transmission time when the PSS, an SSS, or a PBCH is carried onto one 1.4 MHz bandwidth instead of being carried onto several PRBs or instead of being carried onto a plurality of narrow band smaller than 1.4 MHz. For example, 6 TTI is required for the data transmission in order to divide 6-PRB data to be carried onto 1-PRB.

Here, the PSS, the SSS, and the PBCH may be independent regardless of setting of a narrow band.

A narrow band according to an example embodiment may be defined in a unit of PRB. For example, a location of PRB of a narrow band according to an example embodiment is defined continuously, and a band close to the central 72 subcarriers may be used as the narrow band. It may or may not symmetric to the center. Although it is not symmetric to the center before a PRB which is not defined as a narrow band, the band may be set by expanding it in a left and right direction. The order of narrow bands may be given from a low frequency or from a high frequency, or may be from the left or from the right by regarding the center as a starting point. Alternatively, the order of narrow bands may be give in a circular loop form which is clockwise or counterclockwise from the left or from the right by regarding the center a starting point.

A narrow band within 72 subcarriers except for DC located at the center may be defined as a central narrow band, a narrow band placed far right from the central narrow band may be defined as the lowest narrow band, and a narrow band placed far left from the central narrow band may be defined as the highest narrow band. If a terminal needs to monitor a PSS/SSS/PBCH in a cell, it is possible to retune a frequency to the central 72 subcarriers (except for system DC).

An offset may be set such that a location of an uplink narrow band is to be aligned or associated with a legacy PUCCH and/or PRACH. Specifically, a location of an uplink narrow band may be determined to be a legacy PUCCH and/or PRACH+offset.

To support a low price MTC terminal, an entire system bandwidth is not used for communication between the MTC terminal and a base station, but instead a part of a system bandwidth for communication between the MTC terminal and the base station may be set. If the part of the system bandwidth, that is, a narrow band, is set, the narrow band may be defined as a set of continuous physical resource blocks (PRBs).

In the case of a time division duplex (TDD) transmission scheme, an identical set of narrow bands should be set for uplink transmission and downlink transmission. That is, in the case of the TDD transmission scheme, it is required to set uplink transmission and downlink transmission to have the same subcarrier set.

A base station may set a plurality of narrow bands in order to simultaneously support a plurality of MTC terminals. As such, if a plurality of narrow bands is set in order to simultaneously support a plurality of MTC terminals, narrow bands may be set not to overlap each other in order to reduce increasing interference to MTC terminals. To set narrow bands not to overlap each other, the narrow bands may be set as a function of a system bandwidth. In real situation where a large number of terminals exist, it is difficult to determine narrow band sets such that each narrow band does not overlap one another, the interference to MTC terminals can be reduced by applying frequency hopping even though a little overlap exist. Thus, even though overlapped narrow band sets are defined, a frequency hopping pattern can be determined such that no overlap exist.

A downlink narrow band fully overlapping with subcarriers within the central 72 subcarriers (except system DC) may be defined as a central narrow band. Through the central narrow band, broadcasting signals which all MTC terminals need to receive may be transmitted. The central narrow band may be used for frequency hopping between narrow bands. The central narrow band may be used for frequency hopping in the case of downlink or uplink data transmission. For example, in the case of downlink PDSCH and/or PDCCH transmission, frequency hopping may be performed using the central narrow band. Herein, detailed descriptions are provided with reference to FIGS. 5C and 5D.

In a case where a system bandwidth per cell is greater than 3 MHx, a number of non-overlapped downlink narrow bands other than the central narrow band may be set to be specific relative to the system bandwidth.

A non-overlapped downlink narrow band may be defined for a single cell.

The number of available narrow bands and the number of sub-bands may be determined based on a system bandwidth of a cell.

The number of available narrow bands may be determined based on a system bandwidth of a cell. The entire bandwidth used by the narrow band (the number of narrow bands×a bandwidth of a single narrow band) may be less than ½ of a system bandwidth. As a result, some PRBs may not be included any set narrow band. Part of a bandwidth not used exclusively for MTC may be managed separately from narrow bands for MTC. Specific downlink or uplink messages, signals, or data may be transmitted using an edge of the system bandwidth or the central narrow band.

At least in a system bandwidth, other narrow bands may overlap the central narrow band. For example, if a system bandwidth is set to be 3 MHz to solve the short of a frequency band, other narrow bands may overlap the central narrow band, i.e. narrow band sets can be operatively overlapped. Size of a narrow band not close to the central narrow band may be 6PRB.

Figure 4D:
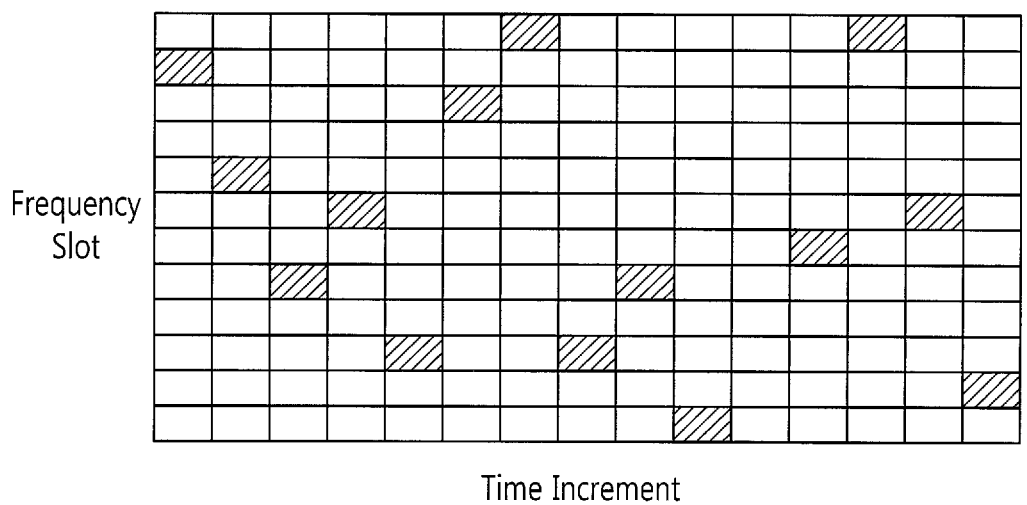
FIG. 4D is a diagram illustrating a frequency hopping pattern according to another example embodiment of the present invention.

FIG. 4D is an example of a frequency hopping pattern according to another example embodiment of the present invention.

In FIG. 4D, a horizontal axis is a time axis, a vertical axis is a frequency axis, and ■ may be data, system information, or a paging signal for MTC communications.

Frequency hopping may be performed on a unit basis of 1.4 MHz, on a unit basis of 200 Khz, or within 1.4 MHz by dividing the bandwidth of 1.4 MHz.

FIG. 4D is an example of a frequency hopping pattern in the case of transmitting data and/or system information, a paging signal, and the like through a downlink or an uplink between a base station and an MTC terminal; however, the frequency hopping pattern is not limited to the example shown in FIG. 4, and various frequency hopping patterns may be used.

In the case of performing frequency hopping of data and/or system information, a paging signal, and the like for MTC communication, a frequency hopping pattern is not limited to the example shown in FIG. 4D so various frequency hopping patterns may be used.

As illustrated in FIG. 4D, by performing frequency hopping, data and/or system information, a paging signal, and the like may be transmitted at a system bandwidth greater than 1.4 MHz, and, in this case, transmit diversity effects may be achieved, which would lead to improvement in performance.

Figure 5A:
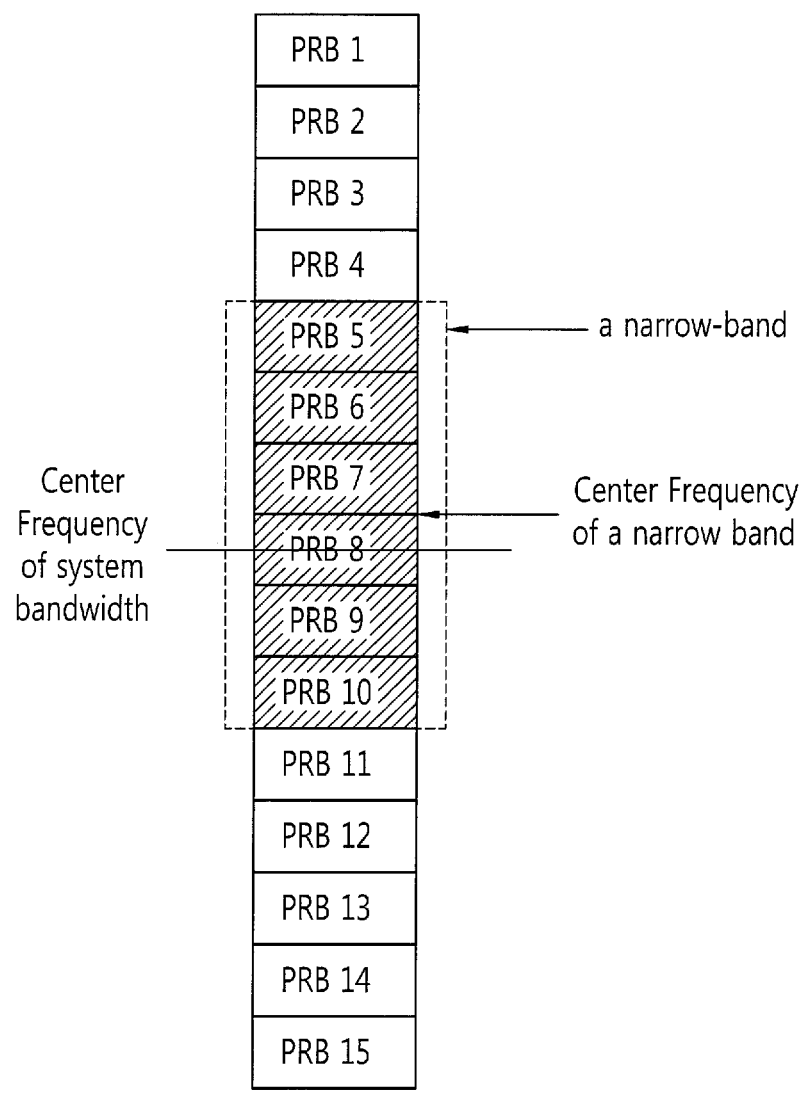
FIG. 5A is a conceptual diagram illustrating a case where a narrow band of 6PRB is arranged to align with legacy RPB mapping according to an example embodiment of the present invention.

FIG. 5A is a conceptual diagram illustrating a case where a narrow band of 6PRB is arranged to be aligned with legacy PRB mapping according to an example embodiment of the present invention. Referring to FIG. 5A, there is an example where size of a narrow band is 6PRB. A central frequency of a narrow band may correspond to a central frequency of a system bandwidth, and the narrow band may be arranged to be aligned with legacy PRM mapping. Alternatively, a central frequency of a narrow band may not correspond to a central frequency of a system bandwidth, as shown in FIG. 5, and the narrow band may be arranged to be aligned with legacy PRB mapping.

Figure 5B:
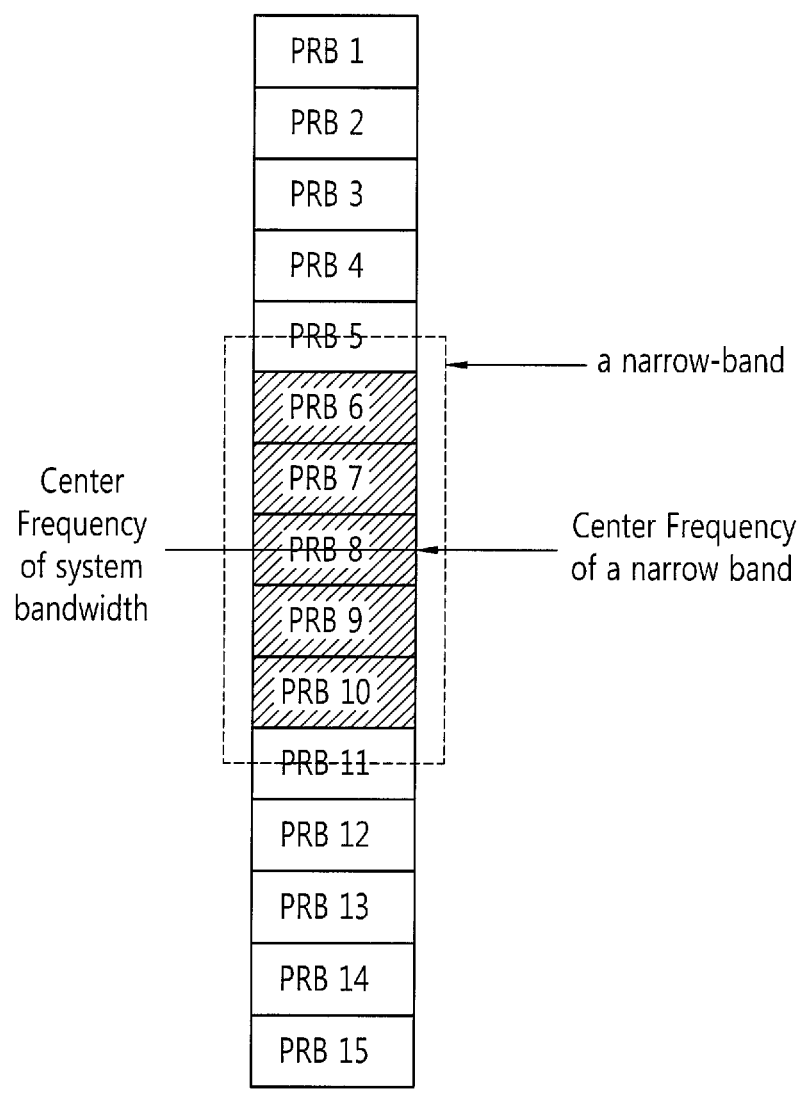
FIG. 5B is a conceptual diagram illustrating a case where a narrow band of 5PRB is arranged to align with legacy RPB mapping according to another example embodiment of the present invention.

FIG. 5B is a conceptual diagram illustrating a case where a narrow band of 5PRB is arranged to be aligned with legacy PRB mapping according to another example embodiment of the present invention.

Referring to FIG. 5B, there is an example where size of a narrow band is 5PRB, and a central frequency of the narrow band may correspond to a central frequency of a system bandwidth, and the narrow band may be arranged to be aligned with legacy PRB mapping. Alternatively, a central frequency of a narrow band may not correspond to a central frequency of a system bandwidth, and the narrow band may be arranged to be aligned with legacy PRB mapping.

Size of a narrow band according to example embodiments of the present invention may be, for example, 5PRB, 4 PRB, or 3PRB, which is smaller than 6 PRB, may be, for example, 7PRB, 8PRB, or 9 PRB, which is greater than 6 PRB, may be 12 PRB two times greater than 6PRB, or 18 PRB three times greater than 6PRB. Size of a narrow band may be fixed to a specific value among a plurality of values or may be used adaptively according to circumstances. For example, if size of a narrow band is small, the number of narrow bands may increase so that it is possible to support a number of MTC terminals or a much wider hopping available bandwidth may be provided. If size of a narrow band is great, it is possible to enhance a data transmission rate.

Figure 5C:
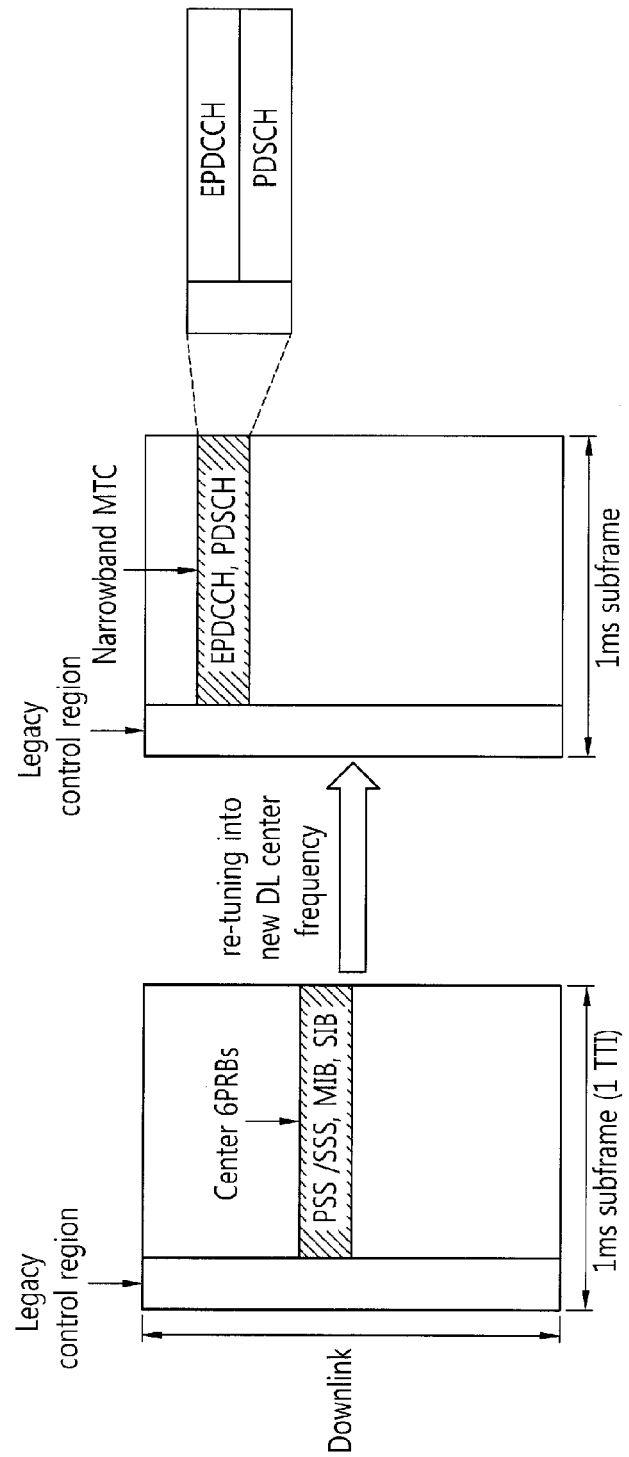
FIG. 5C is a conceptual diagram for supporting a downlink narrow band terminal in a wideband system according to an example embodiment of the present invention.

FIG. 5C is a conceptual diagram for supporting a downlink narrow band terminal in an existing wideband system according to an example embodiment of the present invention. FIG. 5C illustrates one subframe, for example, a subframe of 1 ms, of a downlink frequency of a legacy terminal. By using a re-tuning scheme, as described above, it is possible not only to obtain a frequency diversity gain, but also to utilize an entire system bandwidth and a number of MTC terminals.

Each sell may be embodied to be enabled to support a legacy terminal and an MTC terminal according to an example embodiment of the present invention.

Referring to FIG. 5C, in the case of a downlink frequency of a legacy terminal, a PSS/SSS, an MIB, and an SIB are located within center 6PRB, and, in the case of an MTC terminal according to an example embodiment of the present invention, an offset may be set such that a narrow band of MTC terminal may be set to be aligned or associated with center 6PRB (including an PSS/SSS, an MIB, and an SIB), which is a downlink central frequency of a legacy terminal.

In the case of an MTC terminal according to an example embodiment of the present invention, the downlink narrow band may be re-tuned to a new frequency different from 6PRB. Specifically, the new frequency of the downlink narrow band may be set to be a downlink central frequency of a legacy terminal+an offset. In the case of an MTC terminal according to an example embodiment of the present invention, the downlink narrow band may include a narrow band control channel based on an EPDCCH: for example, the downlink narrow band may include an EPDCCH and a PDSCH. In the case of an MTC terminal according to an example embodiment of the present invention, the downlink narrow band is illustrated as a single narrow band, but it may be set to be a plurality of narrow bands.

Figure 5D:
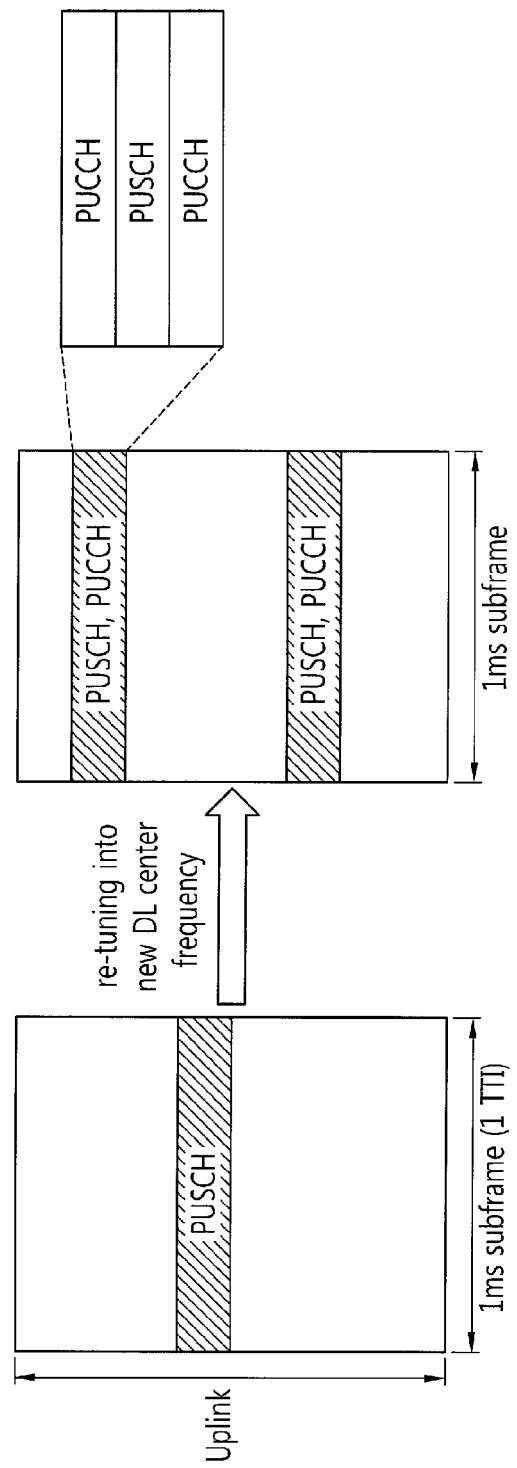
FIG. 5D is a conceptual diagram for supporting a uplink narrow band terminal in an existing wideband system according to an example embodiment of the present invention.

FIG. 5D is a conceptual diagram for supporting an uplink narrow band in an existing wideband system according to an example embodiment of the present invention.

FIG. 5D illustrates a subframe, for example, a subframe of 1 ms, of uplink frequency of a legacy terminal. By using a re-tuning scheme, as described above, it is possible not only to obtain a frequency diversity gain, but also to efficiently use an entire system bandwidth and a number of MTC terminals.

Each cell may be embodied to be enabled to support a legacy terminal and an MTC terminal according to an example embodiment of the present invention.

Referring to FIG. 5D, in the case of an uplink frequency of an legacy terminal, a PUSCH is located within center 6PRB, and, in the case of an MTC terminal according to an example embodiment of the present invention, an offset may be set such that a narrow band of the MTC terminal may be set to be aligned or associated with center 6PRB (including a PUSCH) of an uplink frequency of the legacy terminal.

In the case of an MTC terminal according to an example embodiment of the present invention, the uplink narrow band may be re-tuned to be a new frequency different from center 6PRB. Specifically, the new frequency of the uplink narrow band may be set to be an uplink center frequency of a legacy terminal+an offset. In the case of an MTC terminal according to an example embodiment, the uplink narrow band may include a PUSCH and a PUCCH. In the case of an MTC terminal according to an example embodiment, the uplink narrow band may be set to be a single narrow band or may be set to be a plurality of narrow bands. The uplink narrow band may be set in a unit of one-RB or in a unit of a subcarrier.

Figure 6:
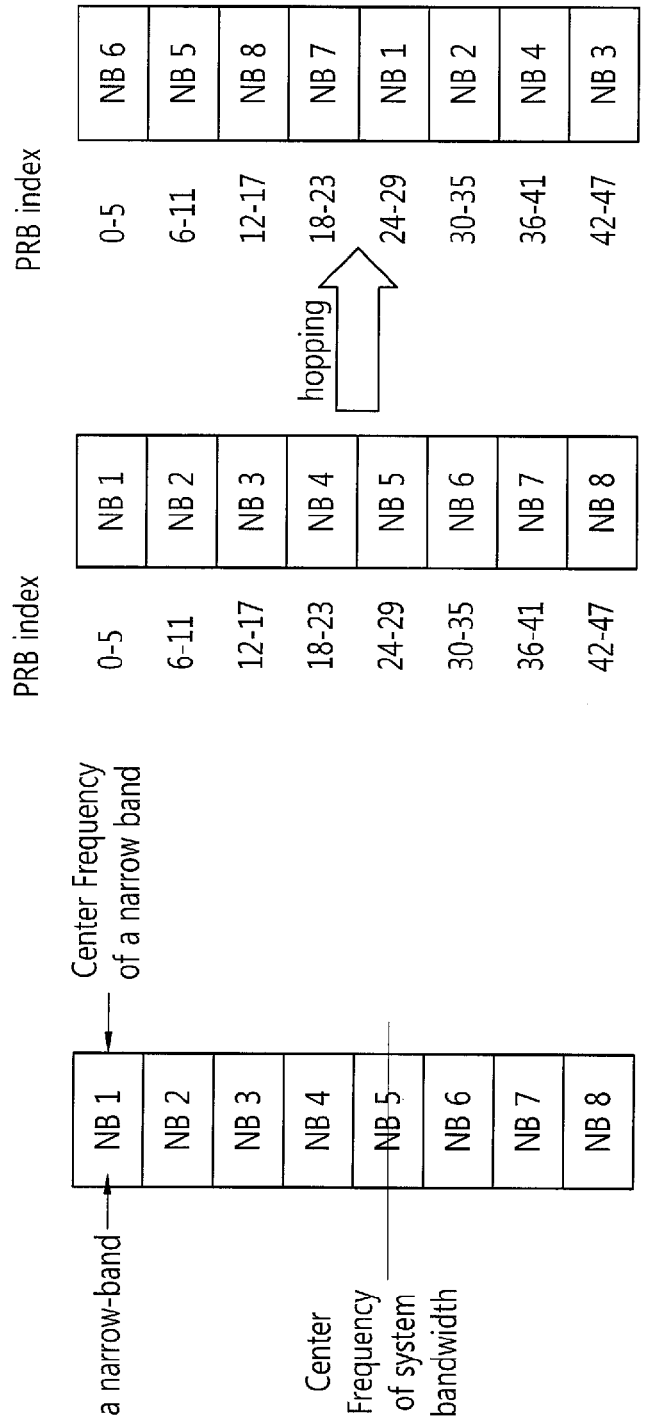
FIG. 6 is a conceptual diagram illustrating a frequency hopping pattern occurring between narrow bands of 6PRB by using a system bandwidth greater than 1.4 MHz according to another example embodiment of the present invention.

FIG. 6 is a conceptual diagram illustrating a frequency hopping pattern occurring between narrow bands of 6PRB by using an entire system bandwidth greater than 1.4 MHz according to another example embodiment of the present invention.

A plurality of narrow bands to be used may be set in advance, an PRB index may be allocated to each narrow band, and a location of a narrow band to be used by an MTC terminal may be notified using the PRB index.

Referring to FIG. 6, narrow bands NB1, NB2, NB8 are at 6PRB, and PRB indexes 0-5, 6-11, . . . , 42-47 are allocated to the narrow bands NB1, NB2, NB8, respectively. For example, when frequency hopping is performed on the eight narrow bands NB1, NB2, NB3, NB4, NB5, NB6, NB7, and NB8, a frequency hopping pattern is in the order of NB6, NB5, NB8, NB7, NB1, NB2, NB4, and NB3, as shown in the right diagram of FIG. 3.

As information for frequency hopping, user information may be used for frequency hopping in an uplink, and system information may be used for frequency hopping in a downlink.

A technology is required to prevent collision which may occur when a base station transmits data and/or system information by performing a frequency hopping scheme. Specifically, to prevent collision of data and/or system information and paging signals between base stations or terminals, the frequency hopping pattern may occur or determined by directly and indirectly using base station identifiers (IDs) and/or terminal (or UE) IDs, or control information or resources may be allocated by directly and indirectly using base station IDs (or cell IDs) and/or terminal (or UE) IDs.

Each hopping pattern is generated as a function of a base station ID in order to prevent collision of hopping patterns between base stations, and a hopping pattern is generated by directly or indirectly using terminal (or UE) IDs in order to prevent collision of hopping patterns between various MTC terminals in the same base station. A hopping pattern refers to a pattern which is performing a two-dimensional (2D) pattern of time and frequency and which determines a frequency band (which is a PRB unit or a narrow band unit) using which a signal is transmitted at each time unit for performing frequency hopping. Accordingly, hopping frequency bands to be used simultaneously need to be different according to base station IDs in order to prevent collision of hopping patterns of different base stations, and thus, it is possible to use a method in which a different group of frequency bands is set according to a base station, or to a use method in which a specific sequence with a function of a base station ID is generated so as to indicate a hopping frequency band at each time unit of performing frequency hopping. An orthogonal sequence or a semi-orthogonal sequence is used as the above sequence so as to minimize a possibility of collision of hopping patterns to occur. Even if some hopping patterns collide, data may be restored with a gain which would be obtained due to repetition transmission, and thus, it is not necessary to use only a biorthogonal hopping pattern.

In the case of a downlink, a frequency hopping pattern may be determined or occur with a base station ID (or a cell ID) and/or an SFN. The SFN is an important parameter which is exchanged between a base station and a terminal for time synchronization, and the base station uses the SFN to change the start, stop, end and cycle of a hopping pattern which is being used or to be used, a set of hopping frequency bands, and a hopping time unit. A time unit of hopping may be a slot or a subframe, which is smaller than a frame unit.

The base station ID may include a cell ID. The terminal ID may include an International Mobile Subscriber Identity (IMSI), a Temporary Mobile Subscriber Identity (TMSI), a Globally Unique Temporary Identifier (GURI), and a Radio Network Temporary Identifier (RNTI).

A method of generating a hopping pattern by indirectly using a base station ID and/or terminal ID is in a manner where a first specific sequence is generated using a corresponding base station ID and/or terminal IDs, and then a final hopping pattern is defined and used by performing secondary deformation on the first specific sequence. A method for the secondary deformation may include combining with other hopping patterns, applying different precoding according to a frequency or time, and employing scrambling or cyclic shift.

In addition, the IMSI is very important information in terms of security, so when the IMSI is used, a method of generating a hopping pattern by allowing a terminal to determine a hopping pattern of its own without directly exchanging IMSI may be a method of indirectly generating a hopping pattern.

A base station may actually generate a hopping pattern and transmit a signal in the case of a downlink, whereas a terminal may actually generate a hopping pattern and transmit a signal in the case of an uplink.

Information on a hopping pattern may be exchanged in a form of control information (signaling) between the base station and the terminal.

Alternatively, in order to reduce overhead which occurs when the base station and the terminal exchanges information on a frequency hopping pattern, the base station and the terminal may not exchange information directly about a frequency hopping pattern since both of the base station and the terminal are informed of each other's ID. Therefore, the base station and the terminal may provide information on a frequency hopping pattern by including, in an MIB, an SIB, or a PDCCH/EPDCCH, information on whether to perform frequency hopping, so that it is possible to reduce overhead which occurs when information on a frequency hopping pattern is exchanged.

Figure 9:
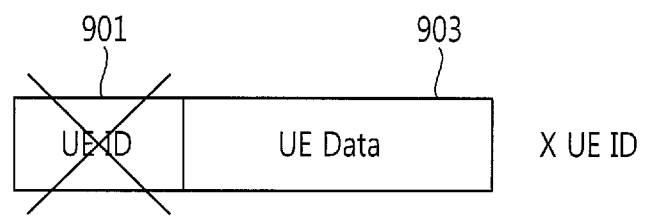
FIG. 9 is a conceptual diagram illustrating a CRC masking method relative to a terminal identification (ID) for reducing overhead according to an example embodiment of the present invention.

FIG. 9 is a conceptual diagram illustrating a method for performing CRC masking on a terminal ID in order to reduce overhead according to an example embodiment of the present invention.

Referring to FIG. 9, in the case of downlink transmission of MTC communication of the present invention, only terminal data is first transmitted to an MTC terminal and then multiplied by the MTC terminal's ID in the MTC terminal. A CRC error does not occur in a CRC masking procedure if the terminal ID is correct, and a CRC error occurs in a CRC masking procedure if the terminal ID is incorrect, and thus, it is possible to reduce overhead by prevent the terminal ID from being transmitted. That is, in the case of MTC communications according to an example embodiment of the present invention, for example, the case of applying the above CRC masking scheme to a broadcasting channel, important information which are different among MTC terminals may be transferred urgently by using some of the broadcasting channel's resources which carry information common among all terminals. In addition, in order to transmit resource allocation information to each terminal in an uplink, every N-bit data is not transmitted just like the legacy LTE, but instead bit data smaller than N is used to provide limited resource allocation information and terminals are enabled to transmit the information within limited resource, so that it is possible to enable MTC communication while reducing overhead.

Scheme of Transmitting MTC System Information (MIB)

In existing MTC, system information for MTC, such as MTC-Master Information Block (MTC-MIB) and MTC-System Information Block (MTC-SIB), is transmitted separately.

An MIB is transmitted at a transmission time interval (TTI) of 40 ms through a PBCH, and the PBCH is mapped with four OFDMs which exist in a subcarrier being at the center of 72 subcarriers in a corresponding frame.

A general LTE MIB has a reserved 10-bit which is not used, and it is possible to transmit additional information (or a parameter) for MTC by using the 10-bit. However, only few bits of MIB is able to be transmitted, and thus, a highly important parameter needs to be included.

Figure 10:
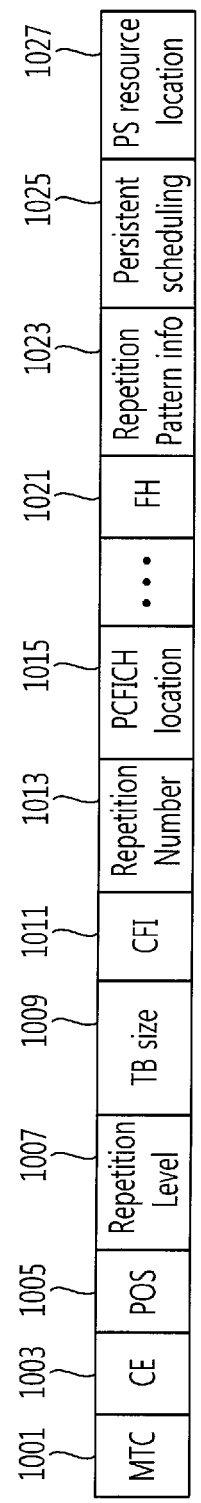
FIG. 10 illustrates additional information that is transmitted using reserved 10 bits of LTE Master Information Block (MIB).

FIG. 10 is a diagram illustrating an example of additional information which is transmitted by using reversed 10-bit of LTE MIB.

Referring to FIG. 10, additional information to be transmitted using the reserved 10-bit may include the following:

Whether a base station supports a MTC terminal (1 bit) (1001)
Whether a Coverage Enhancement (CE) device is supported (1 bit)(1003)
A location of time frequency of MTC-SIB1 (2-3 bit) (1005)
Whether a repetition level of MTC-SIB1 is included (1007)
Transport block size of MTC-SIB1 (2 bit) (1009)
Control Formal Indicator (CFI) (2 bit) (1011)
Number of repetition transmission for performance (1013)
A starting point of MTC BDCCH or location information of PCFICH (1015)

Here, the CFI indicates the number of OFDM symbols used to transmit control channels (PFCCH, PHICH) in each subframe, and also directly or indirectly shows when a data region starts in a subframe.

In addition, the additional information to be transmitted using the reserved 10-bit of MIB for MTC communication may include the following:

Whether frequency hopping is on or off (1021)
Information on a repetition pattern (1023)
Whether to use a persistent scheduling which persistently transmits locations of resources (1025)
Resource location information on persistent scheduling (1027)

The persistent scheduling may improve performance with reduced overhead by minimizing a control signal required for scheduling to transmit a specific pattern (a repetition pattern of a frequency hopping pattern) (or by allocating resources). The persistent scheduling may include, for example, a method in which the specific fixed pattern is transmitted periodically or aperiodically, a method in which the pattern is notified at the first time and the notified pattern is subsequently transmitted, and a method in which a set of patterns is made in advance and a pattern selected from the set is transmitted periodically or aperiodically. Information on whether frequency hopping is on or off (1021) and information on a repetition pattern (1023) may be used when a corresponding base station transmits a specific frequency hopping pattern group of a specific repetition group by using an MIB or an SIB.

The information carried by MIB can be carried by SIB. Thus, the transmission of the bits related with a persistent scheduling can be done through SIB. An important information having higher priority can be transmitted through MIB. Alternatively, the information required for decoding SIB can be transmitted through MIB.

The Information on whether to use persistent scheduling (1025) may not be transmitted through an MIB, SIB, or a specific channel. That is, without transmitting the information on whether to use persistent scheduling (1025) through an MIB, SIB, or a specific channel, it is possible reduce signaling overhead and achieve stable communication simply by using persistent scheduling in which the location of resource is persistently transmitted, and in this case, a frequency hopping pattern and a repetition transmission pattern may be persistent. According to an example embodiment of the present invention, by applying persistent scheduling to repetition transmission pattern and/or frequency hopping pattern in MTC communication, the location of resource may be persistent and also the repetition transmission pattern and/or frequency hopping pattern may be persistent, to thereby reducing signaling overhead.

Here, an existing MIB is system information and thus includes information which is common among all MTC terminals. However, in an example embodiment of the present information, an MTC terminal receives such system information and then defines, in the standard, a specific function which receives a terminal ID, such as an RNTI, a GUTI, an IMSI, and an IMSI of an MTC terminal, as an input, and thus, it is possible to set different parameters for each terminal solely with the system information. That is, a base station is able to include direct ID information of a specific MTC terminal in a system information (an MIS or an SIB) and transmits the system information. For example, regarding a Discontinuous Reception (DRX) cycle parameter, a terminal ID such as an RNTI, a GUTI, an IMSI, and a TMSI may be added to a system information and the system information may be transmitted by using the reserved 10-bit, and accordingly, it is possible to set a different parameter for each terminal. Specifically, if an IMSI of an MTC terminal is applied to an SFN transmitted from a base station to an MIB and an SIB 1, DRX cycle may be determined.

In another example, an MTC terminal may be informed of an SFN by receiving an MBI and an SIB1 from a base station, and applies an IMSI value of the MTC terminal to the SFN so as to set a DRX cycle parameter. DRX cycle is determined in the above manner, so a frequency hopping pattern or repetition transmission pattern may be determined in the same manner.

Scheme for Repetitively Transmitting MTC System Information (MIB)

Now, in the case of existing MTC, system information exclusively for MTC communications, such as an MTC-MIB/MTC-SIB, are transmitted separately.

It is desirable that an MTC terminal transmits the MIB system information repetitively for performance improvement.

The MTC terminal needs 20 dB or greater coverage improvement, but when 1.4 MHHz and a single receiving RF chain are available, the MTC terminal can have data receiving performance poorer than an existing mobile communication terminal. Therefore, there is need for advanced technologies which are able to secure 20 dB or greater coverage improvement despite the above circumstances. Such technologies include a method of improving SNR by repetition transmission and a method of securing diversity gain by performing frequency hopping of 1.4 MHz or less than 1.4 MHz (e.g. 200 KHz or 180 KHz) over the entire band.

However, the repetition transmission may lead to an increase in power consumption, and therefore, the number of repetition transmission needs to be minimized, if possible. Accordingly, it should be used along with additional schemes for performance improvement, such as frequency hopping and beamforming.

However, in the case of an MIB, 1.4 MHz is fixed as a central frequency of each frame, as described above, and therefore, it is not possible to use the frequency hopping scheme. Thus, only the repetition transmission scheme is left to rely on.

There are two ways to repetitively transmit an MIB: transmitting the same signal and transmitting identical data with different types of signals, such as signals which are encoded differently. In the case of repetition transmission of an MIB, data, and/or control information, the same information may be transmitted with different types of signals, such as signals which are encoded differently, and therefore, it is possible to achieve the effects of precoding diversity. For example, in the case of repetitively transmit an MIB, data, and control information, the same information is transmitted with differently coded signals—specifically the first signal may be 1, 1, 1, 1, . . . and subsequent signals for repetition transmission may be 1, -1, 1, -1, . . . .

If a Hybrid Automatic Repeat request (HARQ) scheme is applied along with the repetition transmission scheme, performance would improve further: however, an MIB is for downward communication, not bidirectional communication, and thus, the HARQ scheme is not able to be applied.

A way to repetitively transmit an MIB may be selected from three methods as below.

The first method is that a base station always repetitively transmit an MIB at a predetermined cycle (e.g., 40 m).

The second way is that a base station dynamically determines at a predetermined cycle (e.g., 40 ms) whether to repetitively transmit an MIB.

The third way is that a base station repetitively transmits an MIB in a pattern. The pattern may include predetermined cycles. For example, the pattern may include a plurality of 40 ms or predetermined periods of time.

Schemes for Repetitively Transmitting System Information or Data Except for MIB

As a way of repetitively transmitting system information or data except for an MIB, there are two ways: transmitting the same signal and transmitting the same data with different types of signal.

The way to repetitively transmit system information or data except for an MBI may be selected from three ways as below.

The first way is that a base station always transmits system information or data except for an MIB at a predetermined cycle (e.g., 40 m).

The second way is that a base station dynamically determines at a predetermined cycle (e.g., 40 mb) whether to repetitively transmit system information or data except for an MIB.

The third way is that a base station repetitively transmits system information or data except for an MIB in a pattern. The pattern may include predetermined cycles. For example, the pattern may include a plurality of 40 ms or predetermined periods of time.

Further, MTC may repetitively transmit an MIB, but also MTC may perform bundling which indicates repetitively or collectively transmitting actually all data or control information including system information—for example, an SIB (System Information Block)—.

TTI bundling is a kind of the repetition scheme. The only difference lies in that continuous transmission is performed regarding continuous subframes in the TTI bundling scheme. Applying the TTI bundling scheme to all data or system information may bring about coverage improvement. Bundling is a kind of repetition transmission but is different from general repetition transmission. In case of applying HARQ, when ACK is received, data of next TTI can be transmitted, however, when NACK is received, new data cannot be transmitted and previously transmitted data should be continuously re-transmitted until properly received, and thus it took too long time to transmit data in MTC communication because much data cannot be transmitted due to narrow bandwidth and repetition transmission is performed in MTC communication and can effect internal buffer control. Therefore, according to bundling technology, data of a plurality of TTI to be transmitted may be bundled at once and continuously transmitted.

MTC Repetition Transmission Scheme According to Another Example Embodiment of the Present Invention An MTC repetition transmission scheme according to another example embodiment of the present invention enables repetition transmission in a downlink. Hereinafter, descriptions are provided with an example of a downlink.

An MTC repetition transmission scheme according to another example embodiment of the present invention may enable adaptively adjusting constraints for frequency hopping according to a channel status and/or data characteristics/properties.

An MTC repetition transmission scheme according to another example embodiment of the present invention may enable adaptively adjusting or changing a hopping bandwidth, a guard band, guard time/idle time, and a hopping cycle pattern according to a channel state and/or data characteristics/properties. That is, a frequency hopping pattern may be different according to a channel state, and, specifically, MTC terminal can be operated as a small coverage terminal or a large coverage terminal according to a channel state for the purpose of coverage extension.

The distance between an MTC terminal and a base station increase, the weaker becomes the signal strength, and thereby leading to difficulty of communication. One of the purpose of MTC communication is to extend the available communication range by 20 dB, i.e. to enable MTC communication even at the place where the strength of electromagnetic wave is weaker by 20 dB compared with that of legacy LTE terminal. When the strength of electromagnetic wave become weaker, the SNR decreases and cannot provide enough SNR for communication, and thereby leading to failure of communication. The strength of electromagnetic wave can be decreased greatly not only when the distance between MTC terminal and the base station is far, but also when the distance between MTC terminal and the base station is close in case the MTC terminal such as IoT terminal used as an IoT sensor is located at underground, underwater, or any closed space closed with metal such as steel door.

The base station have difficulty in receiving successfully RACH transmitted from MTC terminal when the strength of electromagnetic wave is weak. Basically, the MTC terminal can register itself desired base station when RACH is successfully received. A method is required to increase SNR by more than 20 dB to compensate for a 20 dB loss of the strength of electromagnetic wave. One of such methods is repetition transmission. However, it is required to reduce the frequency (or number) of the repetition transmission because, when repetition transmission increases, data rate decreases, transmission time increases, power consumption increases, resources are continuously allocated, and thus leading to deterioration of communication efficiency.

The repetition transmission technique is not required when MTC terminal is located closely from the base station or when the loss of the strength of electromagnetic wave is not as large as 20 dB. Therefore, an MTC terminal can be operated as a small coverage terminal or a large coverage terminal according to the loss of the strength of electromagnetic wave—for example, 10 dB, 12 dB, 13 dB, 14 dB, 15 dB, etc—or SNR, and the MTC terminal can be operated with optimal parameters for each of the small coverage terminal and the large coverage terminal. As a result, when the strength of electromagnetic wave does not greatly decrease or when the loss of the strength of electromagnetic wave is not as large as 20 dB, by reducing the frequency (or number) of the repetition transmission, it is possible to prevent negative effect due to the decrease of data rate, the decrease of transmission time, the increase of power consumption, the deterioration of communication efficiency. An MTC repetition transmission scheme according to another example embodiment of the present invention may enable adaptively adjusting a frequency hopping pattern according to a channel state and/or data characteristics/properties.

An MTC repetition transmission scheme according to another example embodiment of the present invention may enable adaptively adjusting or changing a frequency hopping range according to a channel state and/or data characteristics/properties.

An MTC repetition transmission scheme according to another example embodiment of the present invention may enable adaptively adjusting a frequency hopping bandwidth according to a channel state and/or data characteristic/properties. A specific bandwidth may be selected for frequency hopping according to a channel state and/or data characteristics/properties. If a state of a channel at a specific bandwidth is not good, the frequency bandwidth may not be used. If a state of a channel at a specific bandwidth is good, frequency hopping may be performed using the frequency bandwidth.

It is possible to adaptively adjust a guard band or guard time (or idle time) according to a channel state and/or data characteristics/properties. That is, a frequency hopping pattern may be used by designating a specific band as a guard band according to a channel state or by designating a specific time as a guard time according to a channel state.

An MTC repetition transmission scheme according to another example embodiment of the present invention may enable adaptively adjusting a frequency hopping cycle according to a channel state and/or data characteristics/properties.

An MTC repetition transmission scheme according to another example embodiment of the present invention may enable adaptively adjusting length of a frequency hopping pattern according to a channel state and/or data characteristics/properties.

An MTC repetition transmission scheme according to another example embodiment of the present invention may enable adaptively adjusting the number of repetition of a frequency hopping pattern according to a channel state and/or data characteristics/properties.

An MTC repetition transmission scheme according to another example embodiment of the present invention may enable adaptively adjusting the number of repetition of a frequency hopping pattern according to a channel state and/or data characteristics/properties.

If a channel state is good, frequency hopping may not be performed and information on whether frequency hopping is performed may be transmitted from a base station to an MTC terminal.

An MTC repetition transmission scheme according to another example embodiment of the present invention may enable adaptively changing a hopping pattern according to importance of data and data characteristics/properties. For example, important data, such as an MIB, an SIB, control information, and 911 emergency information, are much important than general data, and, in this case, the number of repetition (or frequency) of a hopping pattern is increased to increase a diversity gain so as to reduce a receiving error and therefore improve performance. In another example, frequency hopping may not be performed since there may be a case where it is hard to notify a hopping pattern regarding such important data.

An MTC repetition transmission scheme according to another example embodiment of the present invention may enable adaptively changing a hopping pattern according to data volume. If there is a lot of data to be transmitted, frequency hopping may be performed slowly.

A frequency hopping bandwidth may be 6PRB, 5PRB, 4PRB, 3PRB, 2PRB, or 1 PRB according to a volume of data to be transmitted.

The aforementioned guard time, guard band, guard bandwidth, frequency hopping starting time, frequency hopping ending time, and the like may be notified by a base station to an MTC terminal.

An MTC repetition transmission scheme according to another example embodiment of the present invention may be applied to paging, an SIB, and a Random Access Response (RAR).

An MTC repetition transmission scheme according to another example embodiment of the present invention may be implemented such that frequency hopping is not performed on PSS, SSS, or PBCH, which an MTC terminal first receives, but performed using a preset frequency bandwidth.

An MTC repetition transmission scheme according to another example embodiment of the present invention may enable adaptively adjusting a location where frequency hopping starts to be performed according to a type of an MTC terminal. The MTC repetition transmission scheme according to another example embodiment of the present invention may enable adjust each MTC terminal's location where frequency hopping starts to be performed.

An MTC repetition transmission scheme according to another example embodiment of the present invention may be applied to an uplink.

Method of Notifying Narrow Band Information in the Case of Performing Frequency Hopping In frequency hopping for MTC, the narrow band set of the frequency hopping can be limited to specific set(s) of narrow band such that the frequency hopping is performed at specific set(s) of narrow band.

In the case of LTE downlink frequency hopping for MTC, information on usage of a narrow band, such as a narrow band set, may be notified in the following manners.

First, an available narrow band set may be notified to an MTC terminal by using system information, such as an MIB or an SIB, which are broadcasted to all MTC terminals in a network, and all the MTC terminal may be allowed to use the available narrow band set. Alternatively, information of available narrow band set(s) may be notified to an MTC terminal by encoding MIB and/or SIB with a specific code representing a specific number. Particularly, information of available narrow band set(s) may be notified to an MTC terminal by multiplying MIB and/or SIB data by specific code representing each narrow band set to encode and transmit MIB and/or SIB.

The meaning of multiplying MIB and/or SIB data by specific code representing each narrow band set to encode and transmit MIB and/or SIB, for example in case a base station operates ten narrow band sets, is that ten narrow band sets are not transmitted as bit format but MIB and/or SIB data is multiplied by specific code representing each narrow band set to encode and transmit MIB and/or SIB. Particularly, MIB and/or SIB data is multiplied by a code representing a specific narrow band set to be transmitted to an MTC terminal, the MTC terminal multiplies received MIB and/or SIB data by ten codes, and check if there is a code by which no CRC error occurs and decoding is successfully done so that MTC terminal can identify which narrow band set is encoded.

In case a base station operates ten narrow band sets, the information showing which narrow band set is used can be directly notified to MTC terminal through MIB and/or SIB, alternatively, without preparing for or predetermining ten narrow band sets, the information showing a specific RB is used for narrow band set can be notified to MTC terminal. The location of resource of PDSCH carrying SIB may be notified through PDCCH, when narrow band sets to be used at MTC terminal(s) are predetermined, the information showing which narrow band set(s) is used should be notified to MTC terminal in order to receive PDSCH or PDCCH. Therefore, the information showing which narrow band set(s) is used for SIB should be predetermined or should be notified through MIB to MTC terminal. A specific narrow band set should be used for PDSCH carrying SIB because PDSCH which carries SIB performs frequency hopping, and, if the information of narrow band set is included in SIB, MTC terminal cannot decode since narrow band set of PDSCH carrying SIB is not known to MTC terminal. Alternatively, the narrow band set used for data transmission may be notified through SIB but only narrow band set of PDSCH carrying SIB may be notified through MIB. Alternatively, information of narrow band set may be notified through PDCCH in order to allocate different narrow band set for each MTC terminal, in this case, the narrow band set used by all MTC terminal may be predetermined.

In addition, a terminal ID, such as an RNTI, an IMSI, or a GUTI, may be applied to a predetermined formula so as to allow each MTC terminal to determine a narrow band set or frequency hopping pattern allocated. That is, by using system information and a terminal ID, it is possible for each MTC terminal in a network to determine a narrow band set or frequency hopping pattern which is allocated thereto.

Second, a commonly available narrow band set may be notified to users of a specific group by using a downlink control channel, e.g., PDCCH, and the users of the specific group are allowed to use the available narrow band set.

In addition, a terminal ID, such as RNTI, IMSI, TMSI, or GUTI, is applied to a predetermined formula so as to allow each MTC terminal to determine a narrow band set or frequency hopping pattern allocated thereto. That is, by using a downlink control channel and a terminal ID which are provided to users of a specific group, it is possible for each MTC terminal in a network to determine a narrow band set or frequency hopping pattern allocated thereto.

Third, it is possible to notify an available narrow band set to a specific user by using a downlink control signal, e.g., a UE-specific EPDCCH, and to allow a specific user terminal to use the available narrow band set.

Fourth, it is possible to determine an available narrow band set or frequency hopping pattern by using not only a terminal ID, such as RNTI, IMSI, TMSI, or GUTI, but also cell ID, a System Frame Number (SFN), a subframe index, and a slot index in a process of determining an available narrow band set.

Specifically, an SFN, which is transmitted from a base station as system information, such as MIB and SIB 1, and an IMSI value of each MTC terminal are applied to a predetermined formula so as to allow each MTC terminal in a network to determine an independent narrow band set or frequency hopping pattern allocated thereto. Similarly, not only an SFN and a terminal ID, but also a subframe index and a slot index may be used to change each subframe/slot multi-subframe scheduling information item, so that independent scheduling information for each MTC terminal may be determined.

Similarly, not only an SFN and a terminal ID, but also a subframe index and a slot index may be used to adjust subframe/slot multi-subframe scheduling information of a corresponding slot or a corresponding subframe, so that independent scheduling information for each MTC terminal may be determined.

By doing so, common information for all users or a specific group is transmitted via communications whereas other information may is to be determined by a terminal, and therefore, it is possible minimize overhead so maximize efficiency of the system.

Fifth, if a frequency hopping cycle is notified to an MTC terminal and the frequency hopping cycle is finished, an available narrow band set may be notified based on control information (MIB, SIB, PDCCH, or EPDCCH) and the narrow band set is allowed to be used until the next frequency hopping cycle.

Receiving Technology of MTC Terminal

An MTC terminal may receive various information items one by one if the various information items are provided simultaneously.

However, if data to be provided simultaneously include important information, such as paging (a data arrival notifying signal) system information, the MTC terminal may set priorities and receive the data according to the priorities.

If an MTC terminal according to an example embodiment of the present invention receives various information items simultaneously, priorities may be in an order of MIB, SIB, Paging, and Data, and then the data may be decoded.

Uplink Random Access Technology of MTC Terminal

Regarding coverage improvement, an RACH process in an MTC terminal is important.

In the case of existing MTC, a data transmission rate is about 100 kbps (a bandwidth is fixed to 1.4 MHz), so there is need for a method for dramatically improving coverage while maintaining low power consumption of an MTC terminal.

Regarding a RACH process in an MTC terminal for coverage improvement, if a signal to be transmitted from the MTC terminal to a base station for performance improvement is repetitively transmitted, 1) periodic repetition transmission,
2) dynamic repetition transmission, or
3) persistent repetition transmission is possible.

In the case of periodic repetition transmission, an MTC terminal may repetitively transmitting a signal (e.g., a PRACH preamble) at a predetermined cycle.

In the case of dynamic repetition transmission, an MTC terminal may dynamically determine at a repetition cycle whether to transmit data. Here, a parameter relative to repetition transmission, such as whether to repetitively transmit data and/or the repetition cycle, may be determined by a base station or a network, may be a value set by the MTC terminal, or may be a preset value.

In a repetition pattern including a specific number of continuous cycles, a signal (e.g., a PRACH preamble) may be repetitively transmitted.

Based on the PRACH preamble transmitted from the MTC terminal, the base station determines whether the MTC terminal exists. The PRACH preambles may be predetermined for MTC terminals, the base station can differentiate MTC terminal from general terminal based on difference between PRACH preambles. The PRACH preamble is a kind of code, and a chadoff chu code may be used. Alternatively, the PRACH preamble is not a binary code but it may be multiplied by a binary code to generate a new code.

In particular, regarding the RACH process in an MTC terminal for coverage improvement, a method of distinguishing an MTC coverage extension terminal and a general terminal based on a PRACH signal is required.

Methods of distinguishing an MTC coverage extension terminal and a general terminal without transmitting an additional control signal are as below.

The base station differentiates MTC terminal from general LTE/LTE-A terminal (Legacy terminal), and MTC terminal may be operated as a small coverage terminal or a large coverage terminal, thereby maximizing communication efficiency.

1) The two terminals are distinguished based on a PRACH preamble (that is, a code: CDM), so a base station manages a PRACH preamble group which is exclusive for an additional MTC terminal.

2) The two terminals are distinguished based on Time and frequency resource locations (FDM, TDM)

3) The two terminals are distinguished based on a pattern which is generated by combining a specific pattern indicative of an MTC terminal with an existing PRACH preamble (this method is similar to CDM but different therefrom in that a code is multiplied to an existing code).

In particular, the method 3) may be implemented by adding a new pattern to an existing PRACH preamble code.

For example, in the method 3), the existing PRACH preamble is used, but when the existing PRACH preamble is repetitively transmitted, a different TDM or FDM pattern or a different CDM code value may be used to distinguish the MTC coverage extension terminal from a general terminal. Specifically, according to an index (e.g., 0 to 5 may be allocated according to a repetition pattern) of a repetition pattern used to repetitively transmit 100110, 100110 is transmitted at first and then 011001, which is reverse to 100110, is transmitted to distinguish an MTC coverage extension terminal from a general terminal. If the above is generalized, it would be a c_i_code+a new code or a c_i_code (an existing PRACH preamble code)×a new_code (in the case of CDM). In the case of CDM, a new PRACH preamble code may be made by combining a new code with an existing PRACH preamble in various ways, or a totally new MTC exclusive preamble group may be made. In the case of CDM, the final result would be another PRACH preamble.

Alternatively, a resource allocation pattern, such as TDM/FDM, may be changed based on such a new code. A code may be periodically changed and transmitted in the case of TDM and FDM or a TDM or FDM pattern may be used for the distinction. Accordingly, a code may be changed in a repetition transmission pattern. The change pattern may be a unique pattern which indicates an MTC CE terminal. Specifically, a single specific pattern indicative of an MTC terminal includes a CRC pattern used in the current downlink control channel, and a CRC output may be used in the downlink control channel by performing XOR of the CRC output to C-RNTI. Thus, it may be considered changing a code based on an ID, such as C-RNTI. In addition, not just an ID, but a new code may be defined, and XOR, multiplication, or addition may be performed on the new code and an existing code. If the same code is repetitively, the code may be changed periodically in a specific manner, such as an even or odd number code with code symbols which are in reverse order. A resource allocation pattern is for a method in which time and frequency location of resources to be transmitted are periodically changed in a specific pattern when the same code is repetitively transmitted. In addition, there is a method in which once a PRACH code is allocated to a specific time and to a specific frequency location, an MTC CE terminal is recognized.

The above example is about a method of distinguishing an MTC coverage extension terminal from a general terminal by combining CDM and a repetition transmission pattern. That is, as one of ways to reuse a PRACH code used in existing LTE, the MTC terminal needs to repetitively transmit PRACH and thus the repetition transmission pattern may be combined with an existing PRACH code. That is, by changing an existing PRACH preamble code in a specific pattern at each time for repetition transmission, an MTC coverage improvement may be distinguished from a general terminal. If a code is changed as shown in the above example in order to distinguish the MTC coverage extension terminal from a general terminal, the code may not collide with any code and may be capable of being changed easily.

Another method is combining a specific code indicative of the above 3) MTC terminal with an existing PRACH preamble code. Existing LTE enables discovering its own PDCCH by performing blind decoding. In this case, a new CRC is generated by performing XOR of its own ID (C-RNTI in the case of LTE) on CRC, and then the new CRC is added to DPCCH and then transmitted. Therefore, by checking the CRC, a receiver may determine whether the transmitted PDCCH is the receiver's PDCCH or not. This method enables checking whether a code is changed or not in the case where appropriate change (e.g., XOR) is made to the code with respect to a specific different code. This concept is applied to the method 3). That is, a specific code indicative of an MTC terminal is set, and the specific code is combined with/changed with respect to an existing PRACH code. In the case of LTE, an existing PRACH code is not a binary code, so it is not easy to change the existing PRACH code by performing XOR, and thus, the existing PRACH code needs to be changed in a different manner, such as multiplication.

With respect to a less complicated MTC terminal and an MTC terminal operating in a cell expansion mode, the following three receiving modes may be applied to a RAR message and a paging message.

1) Option 1
The RAR message and the paging message is received using a PDSCH which has been scheduled by an M-PDCCH, that is, a PDSCH whose scheduling information is transmitted by an M-PDCCH.

2) Option 2
The RAR message and the paging message are received using DCI of an M-PDCCH.

3) Option 3
The RAR message and the paging message are received using an M-PDCCH-less PDCSH.

A case of receiving a single MAC RAR message within a narrow band may support the use of DCI of M-PDCCH shown in Option 2.

A case of receiving multiple MAC RAR messages within a narrow band may support the use of PDSCH which has been scheduled by M-PDCCH shown in Option 1.

In a case where the number of MAC RAR messages are less than a specific reference level or where size of an MAC RAR message is smaller than a specific reference level, some of the MAC RAR messages are received as DCI and the rest may be included in PDSCH to be received.

Alternatively, in a case where the number of MAC RAR messages is greater than a specific reference level or where size of an MAC RAR message is greater than a specific reference level, the MAC RAR messages may be received at an MTC terminal not by using DCI of M-PDCCH, but A base station may enable an SIB to indicate whether a mode for receiving an RAR or paging message is supported or not. For example, in a case of indicating where a base station supports only Option 1, Option 1 may be used even for a single MAC RAR.

MTC terminals of the present invention may be used in various application fields, and may be applied to a case where low power consumption is required while communications for infrequent small burst transmission are used. For example, the MTC terminals may be applied to a wearable device which performs smart metering, which is for electric power metering, implements health-related applications, and the like.

Figure 2:
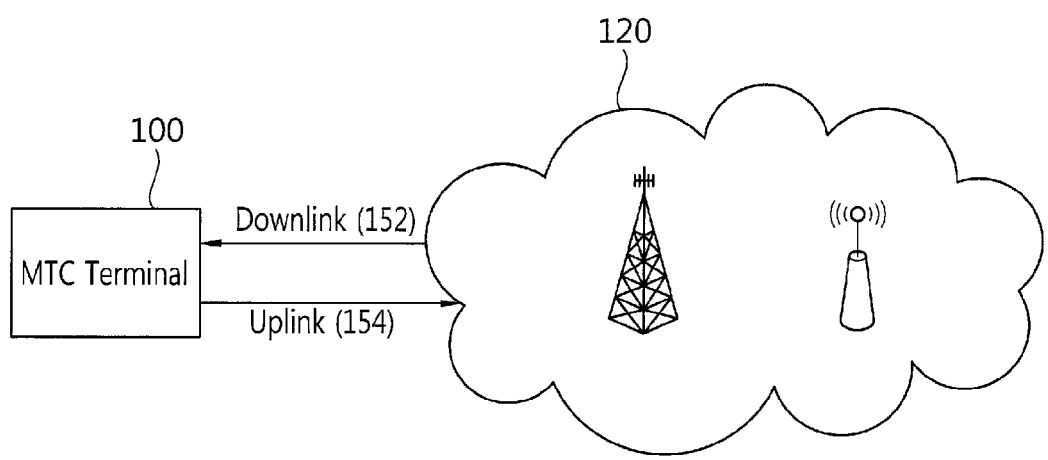
FIG. 2 is a schematic block diagram illustrating an MTC communications system according to an example embodiment of the present invention.

FIG. 1 is a schematic block diagram illustrating an MTC terminal according to an example embodiment of the present invention, and FIG. 2 is a schematic block diagram illustrating an MTC communication system according to an example embodiment of the present invention.

Referring to FIGS. 1 and 2, an MTC terminal 100 includes a transceiver 120, a processor 110, and an antenna 130, and performs MTC communications which includes MTC frequency hopping, transmission of MTC system information (MIB), and MTC terminal uplink random access according to example embodiments of the present invention.

The transceiver 120 receives data and a control signal (a message indicating whether downlink data exists) from the base station 120 through the antenna 130, and transmits data and a control signal (a message for requesting transmission of downlink data) to the base station 120 through an uplink 154.

The processor 110 may control the transceiver to determine a point in time of transmitting a control signal (a message for requesting transmission of downlink data).

The processor 110 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 110 may perform signal coding, data processing, power control, input/output processing, and/or any other functionality that enables the terminal to operate in a wireless environment. The processor 110 may be coupled to the transceiver 120.

While FIG. 2 depicts the processor 110 and the transceiver 120 as separate components, the processor 110 and the transceiver 120 may be integrated together in an electronic package or chip.

For example, in one embodiment, the antenna 130 may be an antenna configured to transmit and/or receive RF signals. In another embodiment, the antenna 130 may be an emitter/detector configured to transmit and/or receive IR, UV, or visible light signals, for example. The transceiver 120 may be configured to modulate signals to be transmitted by the antenna 130, and demodulate signals to be received by the antenna.

The base stations may communicate with one or more of the terminals over an air interface, which may be any suitable wireless communication link, (e.g., radio frequency (RF), microwave, infrared (IR), ultraviolet (UV), visible light, and the like).

The MTC communications system may be a multiple access system and may employ one or more channel access schemes, such as CDMA, TDMA, FDMA, OFDMA, SC-FDMA, and the like. For example, the base station in the RAN and the MTC terminal may implement a radio technology such as universal mobile telecommunications system (UMTS) terrestrial radio access (UTRA), which may establish the air interface using wideband CDMA (WCDMA). WCDMA may include communication protocols such as high-speed packet access (HSPA) and/or evolved HSPA (HSPA+). HSPA may include high-speed downlink (DL) packet access (HSDPA) and/or high-speed uplink (UL) packet access (HSUPA). In another embodiment, the base station and the MTC terminal may implement a radio technology such as evolved UTRA (E-UTRA), which may establish the air interface using long term evolution (LTE) and/or LTE-Advanced (LTE-A).

In other embodiments, the base station and the MTC terminal may implement radio technologies such as IEEE 802.16 (i.e., worldwide interoperability for microwave access (WiMAX)), CDMA2000, CDMA2000 1×, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

In FIG. 2, a base station may be, for example, a wireless router, a Home Node B (HNB), a Home evolved Node B (HeNB), or an Access Point (AP), and may use an arbitrary and appropriate Radio Access Technology (RAT) which makes it wireless access easy in a local area, such as a workplace, a home, a vehicle, a campus, and the like. In an example embodiment, the base station and MTC terminals may implement a radio technology, such as IEEE 802.11, in order to set a Wireless Local Area Network (WLAN). In another example embodiment, the base station and MTC terminals may implement a radio technology, such as IEEE 802.15, in order to set a Wireless Personal Area Network (WPAN). In another example embodiment, the base station and MTC terminals may use a cellular—based RAT (e.g., Wideband Code Division Multiple Access (WCDMA), Code Division Multiple Access 2000 (CDMA2000), Global System for Mobile Communications (GSM), LTE, and Long Term Evolution Advanced (LTE-A)). The base station may have access directly to the Internet. Therefore, the base station may not be required to access the Internet through a core network.

Multi-Subframe Scheduling Scheme in the Case of Performing Frequency Hopping

Information required for multi-subframe channel estimation can be added. In order to perform the multi-subframe channel estimation, a power level or coding scheme of RS (Reference signal), which is a kind of pilot signal, between continuous multi-subframes should not be changed, a power level or coding scheme of CRS(Cell-specific Reference signal) cannot be changed, but a power level or coding scheme of DMRS (Demodulation Reference signal), which is a kind of RS (Reference signal) transmitted for respective terminal, can be changed for each subframe according to legacy LTE/LTE-A standard. Therefore, a power level or coding scheme of URS (UE-specific Reference signal) is not changed in corresponding multi-subframe during multi-subframe channel estimation. Regarding LTE Rel 13UE supporting enhanced coverage, when transmission of a unicast PDSCH is scheduled by an EPDCCH (which is a PDCCH for MTC communications), multi-subframe scheduling may be supported.

In addition, regarding LTE Rel 13 Low complexity MTC UE which supports normal coverage, transmission of a unicast PDSCH is scheduled by an EPDCCH (which is a PDCCH for MTC communications), multi-subframe scheduling may be supported.

Multi-subframe scheduling or cross-subframe scheduling is a scheduling method in which a specific UE burst may be scheduled in various subframes, not an existing scheduling method in which a single PDSCH (or a PUSCH) UE burst is capable of being scheduled in a single subframe and scheduling information of the corresponding UE burst is determined by a single PDCCH/EPDCCH control information item corresponding thereto. That is, unlike the existing method in which scheduling information of a PDSCH burst for a specific UE in a specific subframe may be determined as a single PDCCH/EPDCCH control information item for the specific UE in the specific subframe, a PDSCH burst for a specific UE in various subframes may be allocated by a single PDCCH/EPDCCH control information for the specific UE in a specific subframe.

Figure 7:
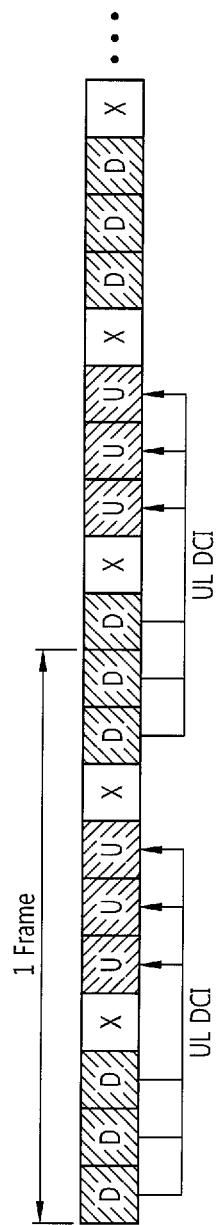
FIGS. 7 and 8 are conceptual diagram illustrating Multi-subframe scheduling or Cross-subframe scheduling in the case of PUSCH transmission according to an example embodiment of the present invention.
Figure 8:
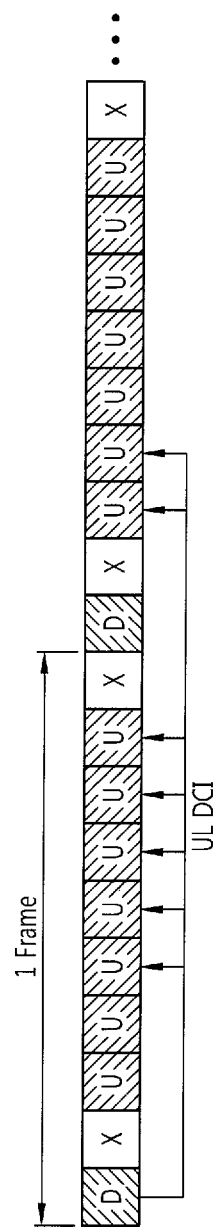

FIGS. 7 and 8 are conceptual diagrams illustrating multi-subframe scheduling or cross-subframe scheduling in the case of transmission of a PISCH according to an example embodiment of the present invention.

As shown in FIGS. 7 and 8, by employing multi-subframe scheduling or cross-subframe scheduling, it is possible to schedule multiple PUSCH transmission (or multiple PDSCH transmissions) in a single Downlink Control Information (DCI) format, thereby dramatically reducing downlink control overhead.

In addition, in the case of PUSCH transmission in FIG. 8, an uplink data rate has 2.33 times greater than that of PUSCH transmission in FIG. 7. Such multi-subframe scheduling or cross-subframe scheduling may be applied to downlink PDSCH transmission.

Multi-subframe scheduling or cross-subframe scheduling may be employed for R12 MTC communication for the purpose of coverage improvement: if an EPDCCH is repetitively transmitted for coverage improvement, it requires long time to decode a great amount of control information at a terminal, so that starting a related PDSCH may be delayed, and, if an MTC terminal supporting coverage improvement employs EPDCCH repetition transmission, multi-subframe scheduling or cross-subframe scheduling is required.

Multi-subframe scheduling or cross-subframe scheduling may dramatically reduce downlink control overhead, power consumption, and the number of switching of subframes, and may increase a data rate.

Hereinafter, a multi-subframe scheduling scheme in the case of performing frequency hopping is described.

1) By using system information, such as an MIB or an SIB, which is repetitively broadcasted to all MTC terminals within a network, it is possible to provide common multi-subframe scheduling information so that all the MTC terminals within the network may use the multi-subframe scheduling information.

In addition, it is possible to enable an MTC terminal to uniquely determine multi-subframe scheduling information allocated thereto by applying a terminal ID, such as RNTI, IMSI, or GUTI, to a predetermined formula. That is, by using system information and a terminal ID, it is possible to enable each MTC terminal within a network to determine multi-subframe scheduling information allocated thereto.

2) It is possible to provide commonly available multi-subframe scheduling information to users of a specific group by using a downlink control channel, such as a PDCCH, which is transmitted to the users of the specific group, so that the users of the specific group may use the available multi-subframe scheduling information.

In addition, it is possible to enable a MTC terminal to uniquely determine multi-subframe scheduling information allocated thereto by applying a terminal ID, such as RNTI, IMSI, TMSI, or GUTI, to a predetermined formula. That is, by using common downlink multi-subframe scheduling information provided to users of a specific group and a terminal ID, it is possible to enable each MTC terminal within a network to determine multi-subframe scheduling information allocated thereto.

3) By using a downlink control channel (e.g., a UE-specific-EPDCCH) transmitted to a specific user, it is possible to provide multi-subframe scheduling information to the specific user so that a terminal of the specific user may use the multi-subframe scheduling information.

4) In the process of determining multi-subframe scheduling information in the aforementioned three manners, an SFN, a subframe index, and a slot index may be further used to determine multi-frame scheduling information.

Specifically, by applying an ID of an MTC terminal and an SFN, such as an MIB and an SIB 1, which is transmitted from a base station as system information, to a predetermined formula used for determining multi-subframe scheduling information, each MTC terminal within a network may be enabled to determine independent multi-subframe scheduling information allocated thereto. In the same manner, each MTC terminal is allowed to adjust subframe/slot multi-subframe scheduling information by using not only an SFN and a terminal ID, but also a subframe index and a slot index, so that each MTC terminal may determine independent scheduling information. By doing so, frequency resources may not be wasted since only information common among all users of a specific group is transmitted via real communications and an additional signal is transmitted in other processes not via communications, and system efficiency may be maximized since the waste of frequency resources may be reduced as an MTC terminal is enabled to make a determination on its own.

Second, a frequency hopping cycle is managed to be aligned with multi-subframe scheduling, so that only scheduling information may be transmitted to an MTC terminal.

Third, by employing semi-static scheduling, it is possible to use control information (e.g., PDCCH) to notify the number of multi-subframes and a starting port and an ending point of a subframe using the same scheduling.

Fourth, two or more of a repetition cycle, a multi-subframe scheduling cycle, and a frequency hopping pattern cycle are managed to be aligned therewith.

Fifth, instead of providing frequency hopping pattern and cycle, repetition cycle and number of times thereof, and multi-subframe scheduling information separately through a PBCH, a PDCCH, and an EPDCCH, one pattern out of the above three, two patterns according to two patterns, and an interaction formula preset between cycles are determined and used, so that control information necessary to be transmitted may be reduced, thereby maximizing system efficiency. The simplest way is the fourth way in which the cycles are aligned with each other.

The above methods enable reducing size of common control information necessary to be transmitted. If there is information capable of being shared between various patterns, the amount of information necessary to be transmitted may be reduced further than transmitting all the information separately, and thus, overhead may be reduced. In particular, in the case of the third method, persistent scheduling is a method which is used in the existing LTE VoIP and in which, in the case of voice, data needs to be transmitted persistently in each subframe since voice has a real-time characteristic. To this end, once a PDCCH/EPDCCH carries scheduling, operations are performed in subsequent subframes according to the same scheduling information since transmitting a PDCCH/EPDCCH attached with scheduling information in each subframe at each time is cumbersome. In order to reuse the scheduling information, only duration of performing persistent scheduling is set and provided since an MTC terminal is mainly about data, not voice, but even a volume of data is small.

Sharing Repetition Transmission Information, Scheduling Information, and Frequency Hopping Information Between an Uplink and a Downlink of an MTC Terminal MTC terminals for coverage improvement may share a repetition level for repetition transmission, scheduling information, and a frequency hopping pattern in a downlink (DL)/uplink (UL).

Here, repetition transmission may indicates repetitively transmitting PBCH carrying an MIB, PDSCH carrying an SIB, a PDCCH, a (E)PDCCH, a PUSCH, a PUCCH, or an RAR.

The repetition level indicates the number of repetition of transmission.

In addition, in a downlink/uplink, the MTC terminals for coverage improvement, a repetition cycle may share the number of repetition, information on a repetition pattern, and information on whether to employ bundling for repetition transmission. Here, bundling is a technology of transmitting an PBCH carrying an MIB, PDSCH carrying an SIB, a PDCCH, a (E)PDCCH, a PUSCH, a PUCCH, and a PRACH repetitively or at once.

In addition, in a downlink/uplink, the MTC terminals for coverage improvement may share resource information regarding persistent scheduling and whether to employ persistent scheduling.

In addition, in a downlink/uplink, the MTC terminals for coverage improvement may share whether to employ multi-subframe scheduling, a multi-subframe scheduling cycle, and the number of multi-subframes.

In addition, in a downlink/uplink, the MTC terminals for coverage improvement may share a frequency hopping cycle and narrow band usage information. For example, the narrow band usage information may include an available narrow band set and information on size of a narrow band. Size of a narrow band may be smaller than 6 PRB, for example, 5 PRB, 4 PRB, and 3 PRB; may be greater than 6 PRB, for example, 7 PRB, 8 PRB, and 9 PRB; may be 12 PRB which is twice greater than 6 PRB; or may be 18 PRB which is three times greater than 6 PRB. Size of a narrow band may be fixed to a value selected from a plurality of numeric values, or may be adaptively used according to circumstances. For example, if size of a narrow band is small, more narrow bands may be provided, and thus, it may be possible to support a plurality of MTC terminals or to provide a wider available frequency hopping band. If size of a narrow band is great, it may be possible to increase a data transmission rate.

As a method of sharing information in a downlink/uplink, the same repetition level, the same scheduling information, and the same frequency hopping pattern of a downlink of an uplink may be used in a downlink. Alternatively, downlink information (a repetition level, scheduling information, and a frequency hopping pattern) is used as an input according to a rule preset in an uplink so as to induce uplink information (a repetition level, scheduling information, and a frequency hopping pattern).

In addition, the same repetition level, the same scheduling information, and the same frequency hopping pattern of a downlink of a downlink may be used in an uplink. Alternatively, uplink information (a repetition level, scheduling information, and a frequency hopping pattern) is used as an input according to a rule preset in a downlink so as to induce downlink information (a repetition level, scheduling information, and a frequency hopping pattern).

In the case of transmitting an RAR, an MTC terminal may be informed, based on a repetition level of the most recent PRACH, of a repetition level of transmission of the RAR.

In the case of transmitting an RAR, an MTC terminal may be informed, based on the most recent PRACH resource set, of a subframe in which the RAR starts to be transmitted.

In the case of transmitting an RAR, an MTC terminal may be informed, based on the most recent PRACH resource set, of a frequency resource(s) in which the RAR is transmitted.

Figure 11:
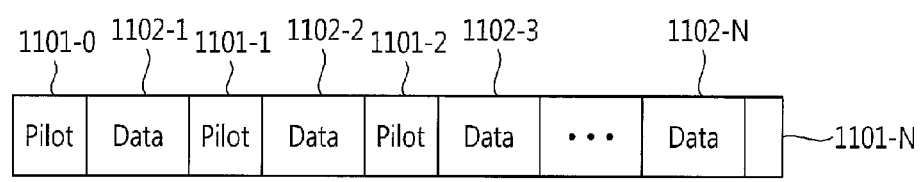
FIG. 11 illustrates an example of a data transmission method for low data rate-based Internet of Things (IoT) sensor application according to another example embodiment of the present invention.

FIG. 11 illustrates an example of a data transmission method for application of an Internet of Things (IoT) sensor which is based on a low-speed data rate according to another example embodiment of the present invention. FIG. 11 illustrates an example of a data transmission method in a case where 1RB is divided into 12 to be applied to an IoT sensor in 200 KHz (e.g., 1RB) which is a data rate of a GSM system. The data transmission method of FIG. 11 uses a low-speed data rate, which is a blue ⅙ of an MTC data rate, and thus may be applied mainly to a low-speed IoT sensor.

Referring to FIG. 11, in the data transmission method for application of an IoT sensor which is based on a low-speed data rate according to another example embodiment of the present invention, a receiver transmits pilots and data arranged alternatively as shown in FIG. 11, wherein a pilot 1101-N is added to the last data 1102-N. Here, the pilot 1101-N may be generated by copying a pilot 1101-0. When decoding data 1002-1, the receiver performs the decoding by using both of a pilot 1000-0 and a pilot 1001-1, thereby achieving decoding accuracy higher than a case where the receiver performs the decoding by using only a pilot 1001-0 (or the pilot 1001-1). In addition, when decoding data 1002-2, the receiver may perform the decoding by using both of the pilot 100-1 and the pilot 1001-2, thereby improving performance much significantly than a case where the receiver performs the decoding by using only the pilot 1001-1 (or the pilot 1001-2). In addition, when decoding the data 1002-N, the receiver performs the decoding by using both of a pilot 1000-(N−1) and a pilot 10001-N, thereby improving performance much significantly than a case where the receiver performs the decoding by using only a pilot 1001-(N−1) (or the pilot 1001-N). The pilot 1101-0 may be omitted when preamble/RS (reference signal) exists before pilot 1101-0.

The PRACH preamble may be transmitted using bandwidth smaller than subcarrier space. SNR increases when the bandwidth decrease. When the bandwidth decrease, the data rate decreases, but there is no side effects due to the decrease of data rate since the PRACH preamble does not include data.

When PUSCH is scheduled to transmit UCI information to be carried via PUCCH, the UCI information to be carried via PUCCH may be transmitted via PUSCH, instead of via PUCCH. Alternatively, the UCI information to be carried via PUCCH may be transmitted via PRACH preamble instead of via PUCCH. Alternatively, some of UCI information to be carried via PUCCH may not be transmitted.

If MTC communications is available at a bandwidth smaller than 6PRB, it is possible to divide 6PRB data over various TTIs. For example, if up to 3PRB is able to be managed at an available bandwidth, a 6PRB signal may be transmitted in two phases. In another example, if 1PRB (180 kHz, about 200 kHz) is available, the 6PRB signal may be transmitted in six phrases.

Legacy LTE uses a kind of Full Deuplex as TDD/FDD. Legacy LTE can transmit and receive simultaneously, but since both transmitter and receiver operate, power consumption increases and complexity increases. Since MTC does not require high data rate, MTC may use Half Duplex so that power consumption and complexity can be reduced compared with Full Deuplex.

Although the embodiments of the present invention have been described, it will be understood by one of ordinary skill that various modifications can be made to the present invention without departing from the scope of the invention defined by the appended claims.

What is claimed is:

1. A method of performing a downlink machine type communication from a base station to a MTC (machine type communication) terminal, the method comprising:
    transmitting, by the base station, at least one of system information, control information and data to the MTC terminal using a system bandwidth having a predetermined size,
    wherein the system information includes at least one of Master Information Block (MIB) and a System Information Block (SIB);
    repetitively transmitting, by the base station, at least one of the system information, the control information and the data to the MTC terminal,
    wherein the repetitively transmitting of the MIB is at least one of repetitively transmitting same signal and repetitively transmitting same data with different types of signal.

2. The method of claim 1, wherein the repetitively transmitting is persistently scheduled by applying a persistent scheduling to a repetition transmission pattern.

3. The method of claim 1, wherein the different types of signal is a signal encoded differently.

4. The method of claim 1, wherein an MTC coverage extension terminal is operated as at least one of a small coverage terminal and a large coverage terminal.

5. The method of claim 1, wherein a repetition level for the repetition transmission is commonly used in both the downlink machine type communication and in an uplink machine type communication.

6. The method of claim 1, wherein a number of repetition and information on a repetition pattern for the repetition transmission are commonly used in both the downlink machine type communication and in an uplink machine type communication.

7. The method of claim 1, wherein the same repetition level of an uplink machine type communication is used in the downlink machine type communication.

8. The method of claim 1, wherein if an RAR (Random Access Response) is transmitted, a repetition level of transmitting the RAR (Random Access Response) is informed to the MTC terminal based on a repetition level of the most recent PRACH (Physical Random Access Channel).

9. The method of claim 1, wherein the repetitively transmitting of the Master Information Block (MIB) is repetitively transmitting of PBCH carrying the Master Information Block (MIB),
    wherein the at least one of repetitively transmitting the same signal and repetitively transmitting the same data with different types of signal is at least one of repetitively transmitting same data with same electrical signal and repetitively transmitting the same data with different types of electrical signal, and
    wherein the data in the same data represent the Master Information Block (MIB) and the signal in the same signal and the signal in the different types of signal include a signal for transmitting PBCH (Physical Broadcast Channel).

10. An apparatus for performing a downlink machine type communication in a wireless communication system, the apparatus comprising:
    a transceiver that transmits and receives a radio signal; and
    a processor operatively coupled with the transceiver and configured to:
    transmit at least one of system information, control information and data to a MTC terminal using a system bandwidth having a predetermined size,
    wherein the system information includes at least one of Master Information Block (MIB) and a System Information Block (SIB); and
    repetitively transmitting at least one of the system information, the control information and the data to the MTC terminal,
    wherein the repetitively transmitting of the MIB is at least one of repetitively transmitting same signal and repetitively transmitting the same data with different types of signal.

11. The apparatus of claim 10, wherein the repetitively transmitting is persistently scheduled by applying a persistent scheduling to a repetition transmission pattern.

12. The apparatus of claim 10, wherein the different types of signal is a signal encoded differently.

13. The apparatus of claim 10, wherein an MTC coverage extension terminal is operated as at least one of a small coverage terminal and a large coverage terminal.

14. The apparatus of claim 10, wherein a repetition level for the repetition transmission is commonly used in both the downlink machine type communication and in an uplink machine type communication.

15. The apparatus of claim 10, wherein a number of repetition and information on a repetition pattern for the repetition transmission are commonly used in both the downlink machine type communication and in an uplink machine type communication.

16. The apparatus of claim 10, wherein the same repetition level of an uplink machine type communication is used in the downlink machine type communication.

17. The apparatus of claim 10, wherein if an RAR (Random Access Response) is transmitted, a repetition level of transmitting the RAR (Random Access Response) is informed to the MTC terminal based on a repetition level of the most recent PRACH (Physical Random Access Channel).

18. The apparatus of claim 10, wherein the repetitively transmitting of the Master Information Block (MIB) is repetitively transmitting of PBCH carrying the Master Information Block (MIB),
    wherein the at least one of repetitively transmitting the same signal and repetitively transmitting the same data with different types of signal is at least one of repetitively transmitting same data with same electrical signal and repetitively transmitting the same data with different types of electrical signal, and wherein the data in the same data represent the Master Information Block (MIB) and the signal in the same signal and the signal in the different types of signal include a signal for transmitting PBCH (Physical Broadcast Channel).

* * * * *